United States Patent [19]

Woodward

[11] Patent Number: 4,890,266

[45] Date of Patent: Dec. 26, 1989

[54] ACOUSTIC RANGE FINDING SYSTEM

[75] Inventor: Steven J. Woodward, Port Hope, Canada

[73] Assignee: Federal Industries Industrial Group Inc., Toronto, Canada

[21] Appl. No.: 190,391

[22] Filed: May 5, 1988

Related U.S. Application Data

[63] Continuation-in-part of Ser. No. 41,877, Apr. 22, 1987, Pat. No. 4,831,565, which is a continuation-in-part of Ser. No. 916,013, Oct. 3, 1986, Pat. No. 4,821,215.

[51] Int. Cl.[4] .............................................. G01S 15/08
[52] U.S. Cl. ...................................... 367/99; 367/98; 367/901; 367/908; 73/290 V; 340/627; 364/561
[58] Field of Search ................... 367/98, 901, 908, 99; 73/290 Y; 340/621; 364/517, 561, 572, 574, 724.01

[56] References Cited

U.S. PATENT DOCUMENTS

| | | | |
|---|---|---|---|
| 3,380,018 | 4/1968 | Littrell et al. | 367/98 |
| 3,505,637 | 4/1970 | Abruzzo | 367/98 |
| 3,944,963 | 3/1976 | Caporin et al. | 367/105 |
| 4,596,144 | 6/1986 | Panton et al. | 73/290 V |
| 4,700,569 | 10/1987 | Michalski et al. | 367/908 |

Primary Examiner—Thomas H. Tarcza
Assistant Examiner—Daniel T. Pihulic
Attorney, Agent, or Firm—Ridout & Maybee

[57] ABSTRACT

In acoustic level sensing apparatus, in which pulses of acoustic energy are transmitted by an electrically energized transducer towards a surface to be sensed, and the electrical output from the transducer following the pulse is digitized and analyzed to detect a return echo from the surface, so as to produce a digitized echo profile. The digitized echo profile is enhanced by removing narrow peaks likely to correspond with certain types of spurious echo, and narrow valleys which may represent fragmentation of a wanted echo. Echoes are identified by comparing the profile with a time varying threshold generated derived from a linear regression performed on part of the threshold, various different types of comparison being performed and their results combined prior to selecting the most likely true echo on the basis of the combined results.

16 Claims, 8 Drawing Sheets

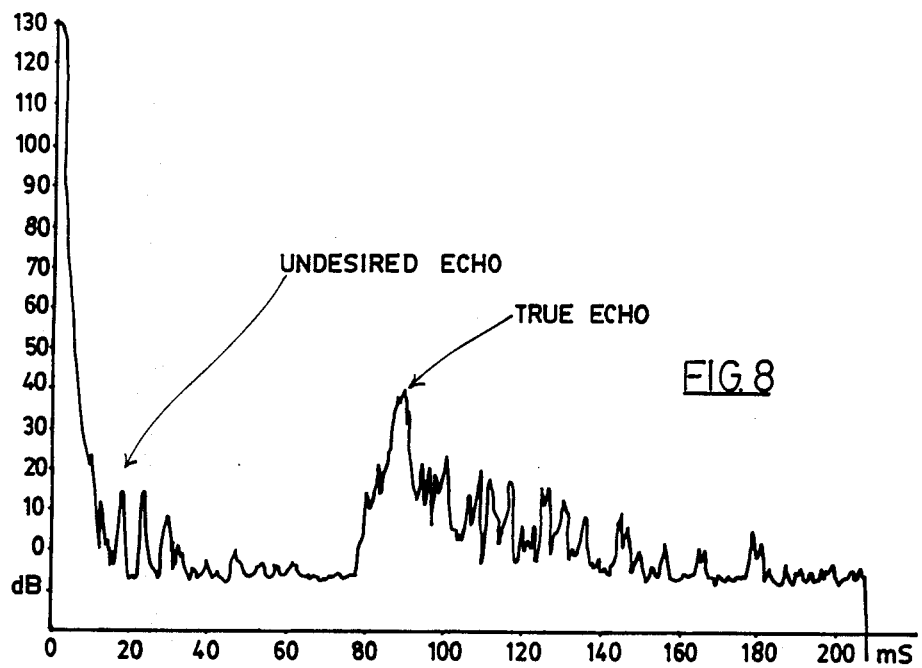
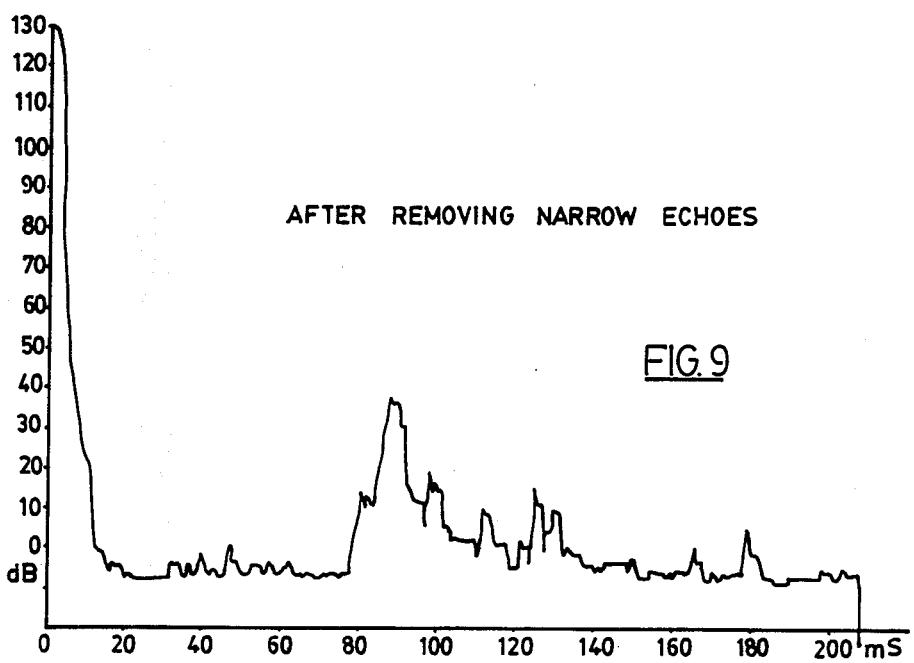

ACOUSTIC RANGE FINDING SYSTEM

This application is a continuation-in-part of my co-pending application No. 07/041,877 filed Apr. 22, 1987, which issued as U.S. Pat. No. 4,831,565 on May 16, 1989, which in turn was a continuation-in-part of patent application Ser. No. 06/916/013 filed Oct. 3, 1986, which issued as U.S. Pat. No. 4,821,215 on Apr. 11, 1989.

BACKGROUND OF THE INVENTION

1. Field of the Invention

This invention relates to acoustic range finding systems of the type in which an electro-acoustic transducer transmits a pulse of acoustic energy towards a surface whose distance is to be measured, and subsequent signals received from the transducer are monitored to determine the temporal location of an echo from that surface.

2. Review of the Art

In practice, problems arise in resolving the wanted true echo from other signals produced by the transducer or its connections. U.S. Pat. No. 4,596,144 of which I am co-inventor, describes methods of detecting a true echo in an ultrasonic range finding system which are essentially of a statistical nature, and not only identify an echo resulting from a particular shot but are capable of quantifying the degree of assurance that a selected echo is a true echo. This latter information may be utilized in determining whether additional shots are required to provide reliable data.

All of the echo extraction techniques described in U.S. Pat. No. 4,596,144 have the following steps in common:

1. An echo profile is formed by taking one or more shots, i.e., applying transmit pulses to the transducer, and recording a series of digitized samples of the received signal to form a data base characterizing the echo profile.

2. The first part of the echo profile is blanked in order to cover over the transmit pulse and some transducer ringing. In order to obtain acceptable efficiency, the transducer must have a reasonably high quality factor or Q, and this results in an exponentially decaying oscillation of the transducer which continues after the end of the transmit pulse and initially forms the major portions of the transducer output to a receiver which processes the transducer output. Although the start of the echo profile coincides with the start of the transmit pulse, the useful echo information occurs after the end of blanking.

3. A reference curve is formed. The curve starts at a fixed start point and then follows the profile.

4. The most probably correct echo is selected by comparing the echo profile with the reference curve.

Certain problems arise in the application of these techniques.

Firstly, it is desirable to set the start point of the reference curve low in order to confidently detect valid close-in echoes. On the other hand it is desirable to set the start point high so that the reference curve will clear the unblanked portion of the transducer ringing following the blanked portion, otherwise the ringing may be deemed to be the correct echo.

In the apparatus described in U.S. Pat. No. 4,596,144, the start point may be set manually by entering a value from the keyboard, or automatically. To set the start point automatically, the operator must first ensure that the material level is well down from the transducer, and then by use of the keyboard instruct the computer to calculate a start point which will cause the reference curve to clear the transducer ringing following the blanking interval. The start point cannot be set with a full bin because the valid close-in echo may appear to be transducer ringing and the start point would be set high to clear this echo, with resultant detection of a spurious echo.

A further problem arises because of variations in transducer ringing. The ringing may increase for the following reasons:

1. An increase or decrease in temperature.
2. A change in the mounting of the transducer; for example, the mounting bolts of the transducer may be tightened.
3. Natural aging of the transducer.
4. Replacement of the transducer.

The operator must recognize these factors and set the start point high enough to clear the worst case of expected ringing. If the start point is too high then valid close-in echoes will not be detected. If the start point is set too low then the apparatus may initially operate correctly, but a change of season will probably cause an increase in ringing and the start point must then be increased. If a compromise cannot be achieved then the blanking interval must be increased so that less of the ringing is seen. The disadvantage of increasing the blanking is that levels in the top portion of the bin cannot be measured, and the useful height of the bin is thus reduced.

In transmitter design a trade off is made in selecting the transmit pulse width. A narrow pulse width has the effect of shifting the ringing to the left, when viewed graphically, simply because the end of transmission occurs sooner. The position of the echo remains the same and therefore close-in echoes will stand out more above the ringing. A wide transmit pulse has the effect of producing the largest possible return echo, even in the presence of air currents which tend to disperse the sound wave, as often happens with distant targets.

Much effort has been directed to improving transducer performance, but in the present state of the art it is not possible to consistently manufacture a transducer with low and stable ringing while still maintaining other desirable features such as high sound output and rugged construction.

My co-pending and commonly assigned Applications Nos. 916,013 and 041,877 disclose improvements providing the ability to relieve an operator from any involvement in setting the starting point or similar parameter, the ability to have the system continuously and automatically compensate for changes in transducer ringing, the ability to adjust automatically the operation of the system so that close-in echo detection is improved without compromising far echo detection, and the ability to detect defective or absent transducers or transducer connections. The techniques disclosed include the selective use of shots of short or long pulse duration according to whether a close-in or distant echo is detected. This provides substantial improvements in close-in performance. A need remains however for improved processing of more distant echoes.

U.S. Pat. No. 4,596,144 discloses several techniques for processing the data stored following a shot or shots so as to identify a desired echo in the presence of spurious echoes, these techniques being described with reference to FIGS. 3, 4 and 5 of the drawings of that patent, and developments of these techniques, particularly in relation to the initial portion of the echo profile, are disclosed in my pending applications already mentioned above. Various problems in echo identification however remain, as follows.

Many bins have false targets in the path of the sound wave. These targets can be in the form of pipes or wires but often consist of seams in the bin wall. In a narrow bin it is usually impossible to move the transducer far enough away to avoid these targets.

In bins containing solids, the material often rests at an angle with several steps in the material. Due to spreading the transducer beam echoes are received from more than one of these steps. Because each step is at a different distance from the transducer a cluster of echoes is received which may be overlapped in time or have narrow gaps between them. In the latter case the echo selection algorithms see these echoes as separate echoes (which they are) even though they sould be considered as one echo.

Practical embodiments of my previous inventions have utilized echo processing techniques of the type described with reference to FIG. 4 of U.S. Pat. No. 4,596,144, to provide a time varying threshold or TVT by smoothing the echo profiles, the TVT being utilized as a reference for comparing echoes. I now find that this method of deriving a TVT may not provide optimum performance in compensating for circumstances in which sound attenuation within a bin varies with time, nor in matching the sound attenuation which takes place with increasing bin depth.

With targets which are close to the transducer, the echo produced by the target is partially masked by the transducer ringing. Assuming that the echo rises above the ringing by some amount then it is possible to detect its presence. A problem arises in comparing the strength of this echo with other later echoes in order to select the most likely true echo. In previous arrangements the TVT curve followed the smoothed echo profile so the size of a close-in echo could at best be equal to the amount by which it exceeded the ringing.

Some bins contain a fixed undesired target, such as a rough area on the bin wall. This false target can be difficult to distinguish from a true target. A known solution is to place a time window around the false target such that echoes within this window will not be considered in the echo selection process. When the location of the true echo enters this window the last correct reading is held until the location of the true echo leaves the window. There are two problems with this method; firstly, the level is not being measured when it is within the window and secondly, when the level is within the window there may be another strong false echo present outside the window, which will be selected as the true echo.

I have further found that no one echo identification technique which I have investigated uniformly provides the best results under all bin conditions.

SUMMARY OF THE INVENTION

I have now developed improved techniques for echo signal processing which address the above problems in three ways, firstly by enhancing the stored echo profile to improve the likelihood of detecting a true echo, secondly by providing an alternative technique for generating a time varying threshold or TVT utilized to detect echoes, and thirdly by providing improved techniques for selecting a true echo from amongst multiple echoes.

The invention is thus directed to improvements in an acoustic ranging system comprising at least one electro-acoustic transducer directed towards the surface of material whose level is to be determined, a transmitter to transmit pulses of high frequency electrical energy to energize selectively each said transducer whereby to cause it to emit at least one shot of high frequency sound, a receiver receiving and amplifying electrical energy from said at least one shot regenerated by said transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo.

In a first improvement, the computing means is programmed to examine the digital data base file depicting the profile of the received signal to measure the height and width of peaks in the profile, and to modify the profile by removing peaks whose height to width ratio is deemed too great for them to represent a true echo.

In a second improvement, the computing means is programmed to examine the digital data base file depicting the profile of the received signal to measure the width of valleys in the profile, and to remove valleys whose width is so narrow that peaks which they separate are deemed possibly to represent fragmented echoes from a common target.

In a third improvement, and assuming that the digitized samples forming the data base file are logarithmic representations of the sample amplitude, the computing means is programmed to perform a linear regression upon at least a portion of the data base file to produce a file containing a linear time varying threshold and to compare the data base file depicting the signal profile with the linear time varying threshold file to identify peaks in the signal profile.

In a fourth improvement, the computing means is programmed to generate a file containing a time varying threshold, and to compare this file with the data base file depicting the signal profile both to identify peaks in the latter and the magnitude of such peaks utilizing successively different criteria, so as to generate a file containing the summed magnitudes of the peaks located at different locations on the profile, and to select the largest of said summed magnitudes as identifying a peak in the echo profile representing a true echo.

In a fifth improvement, the computing means is programmed to introduce a predetermined local upward adjustment into a time varying threshold generated for comparison with the digital data base file depicting the profile of the received signal, the adjustment being at a location and of a magnitude such as to prevent detection of a spurious echo of known location and magnitude.

By incorporating these improvements, the effect of the problems discussed above can be reduced, and the likelihood of selecting the correct echo can be improved.

SHORT DESCRIPTION OF THE DRAWINGS

In the drawings:

FIGS. 8-11 are graphs illustrating certain functions carried out by the routine.

DESCRIPTION OF THE PREFERRED EMBODIMENT

Figure 1:
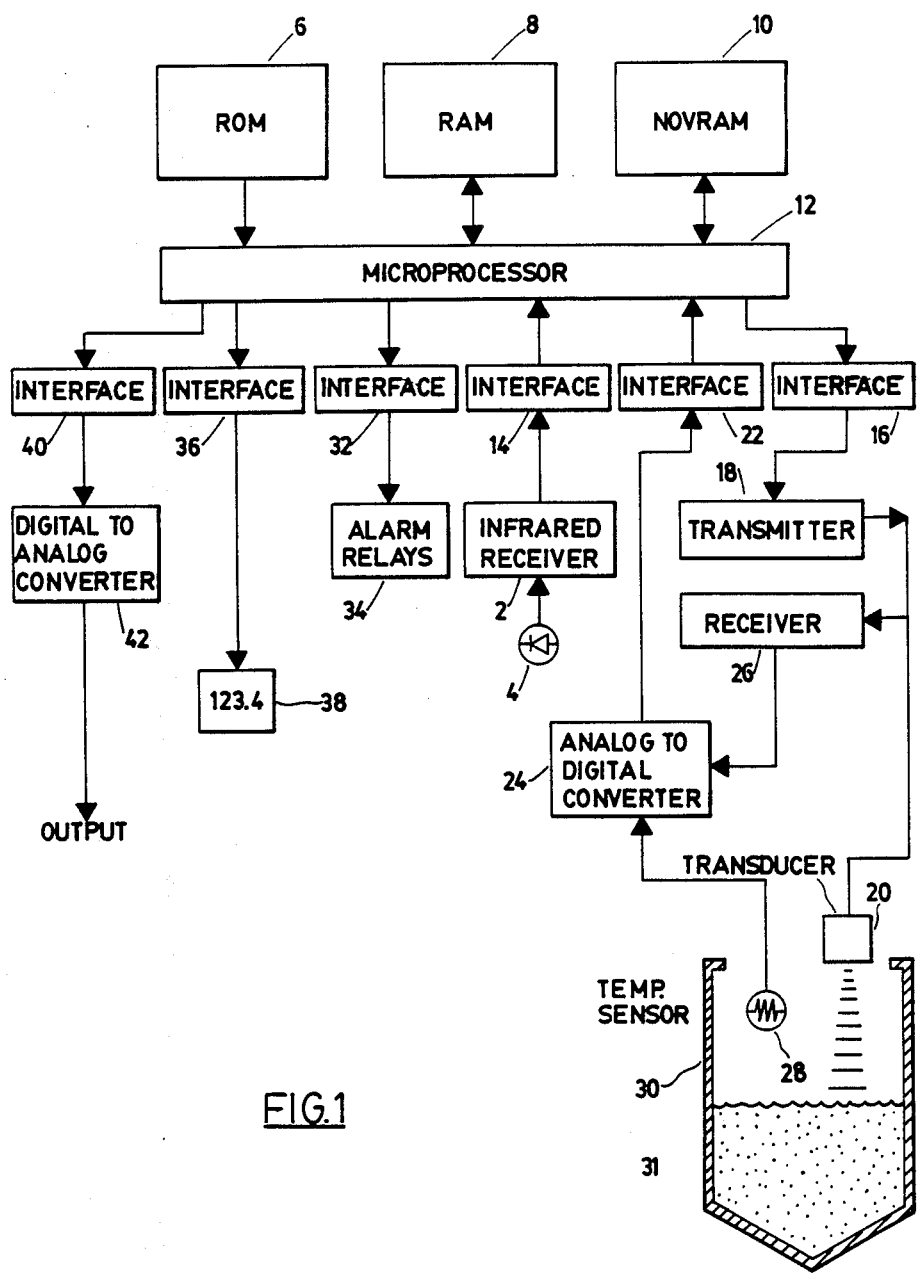
FIG. 1 is a block schematic diagram of a presently preferred embodiment of a system in accordance with the invention.

Referring to FIG. 1, the diagram shown of a computer unit is a simplified version of that shown in FIG. 1 of U.S. Pat. No. 4,596,144, with the difference that the keyboard 52 and control keys 58 of that patent are replaced by an infrared receiver 2 associated with an infrared sensor diode 4, and the division of the memory in three rather than two parts, read only memory 6, random access memory 8 and non-volatile memory 10. The non-volatile memory may be implemented by a conventional RAM with battery backup, or implemented by RAM chips with integral battery backup, or by electrically alterable and erasable read only memory, or magnetic bubble memory or any other suitable technology combining the ability to retain memory content under power down conditions with the ability to alter memory content under program control. The non-volatile memory, referred to for convenience as NOVRAM, is utilized for retaining constants which are dependent on a particular installation or configuration or which only require alteration at long intervals, such as configuration and calibration data.

The read only memory 6 contains a predetermined program which controls a microprocessor 12, which in turn utilizes the random access memory 8 for working memory and temporary storage of variable data, whilst constants other than those predetermined by the program itself are stored in the NOVRAM 10. The main portion of the program itself may be essentially as described in U.S. Pat. No. 4,596,144 except for amendment to segregate the data addresses utilized appropriately between the memories 8 and 10, and any revision of the routines associated with an interface 14 to the receiver 2 so as to suit it to receive data from such a source rather than a keyboard or control keys. The portion of the program related to echo recognition is however further developed as set forth below with reference to FIG. 2 onwards, with a view to improving echo detection performance.

Further interfaces are provided to various other microprocessor peripherals. An interface 16 is provided to a transmitter 18 sending pulses to an external ultrasonic transducer 20, an interface 22 with an analog to digital converter 24 receiving return signals from the transducer 20 via a receiver 26, and from an external temperature sensor 28. The transducer 20 and sensor 28 are appropriately mounted in relation to a bin or silo 30 which is being monitored. An interface 32 is provided to an alarm relay unit 34, which may drive alarm indicator lamps and possibly external alarm devices, whilst an interface 36 drives a digital display 38. A further interface 40 drives a digital to analog converter and current source serial data transmitter 42. Whilst the various interfaces have been shown as separate functional blocks, it will be understood that they may be implemented by a lesser number of physical interface circuits providing multiple ports, or may be integrated either into the peripheral circuit which they interface or into a micro-computer which may incorporate the microprocessor 12 and all or part of the memories 6 and 8.

The diode 4 associated with the receiver 2 can receive modulated data from an infrared source diode driven by a coding circuit, which causes the diode to emit different pulse trains according to which key of a number of keys on a separate keypad has been depressed. The diode, encoder, a battery powering the circuit, and the keypad, are incorporated into a small portable calibrator unit which may be constructed similarly and utilizing similar devices, to the infrared remote control units widely used to control domestic appliances such as television sets. The receiver 2 and diode 4 may also be similar to those utilized in remote control receivers and providing digital outputs responsive to key presses applied to a keypad on a transmitter.

In operation, and under program control, the interface 16 outputs a trigger pulse to the transmitter and receiver 18 and 26, resulting in the transmission of a shot and the subsequent reception, logarithmic amplification and digitization of the return echo signal, as described in more detail in U.S. Pat. No. 4,596,144. Bytes representing the digitized sample are input from ADC 24 through a parallel input port provided by interface unit 22 and are stored in memory 8. If the program calls for additional shots at the same transducer 20, the data recovered from these is stored and averaged or otherwise correlated with the data stored from previous shots. Typically provision is made for separate storage in memory of data from at least three shots. The data stored in memory thus represents the echo profile of a shot or shots and/or the average profile of a series of shots, represented in terms of amplitude in decibels after successive intervals of, typically, 0.25 ms if a 5 cm resolution is required. The routines utilized are further described in my copending application No. 041,877, the content of which is herein incorporated by reference. The present system thus generates a digital data base or echo profile which can be subjected to further processing with a view to maximizing likelihood of correctly identifying a wanted echo.

The data so stored is processed under program control using signal processing algorithms embodied in a routine stored in ROM 6 designed to detect a wanted echo. Certain parameters, utilized by the routine may be changed from default selections stored in ROM 6 by data entered via receiver 2.

Figures 2, 3:
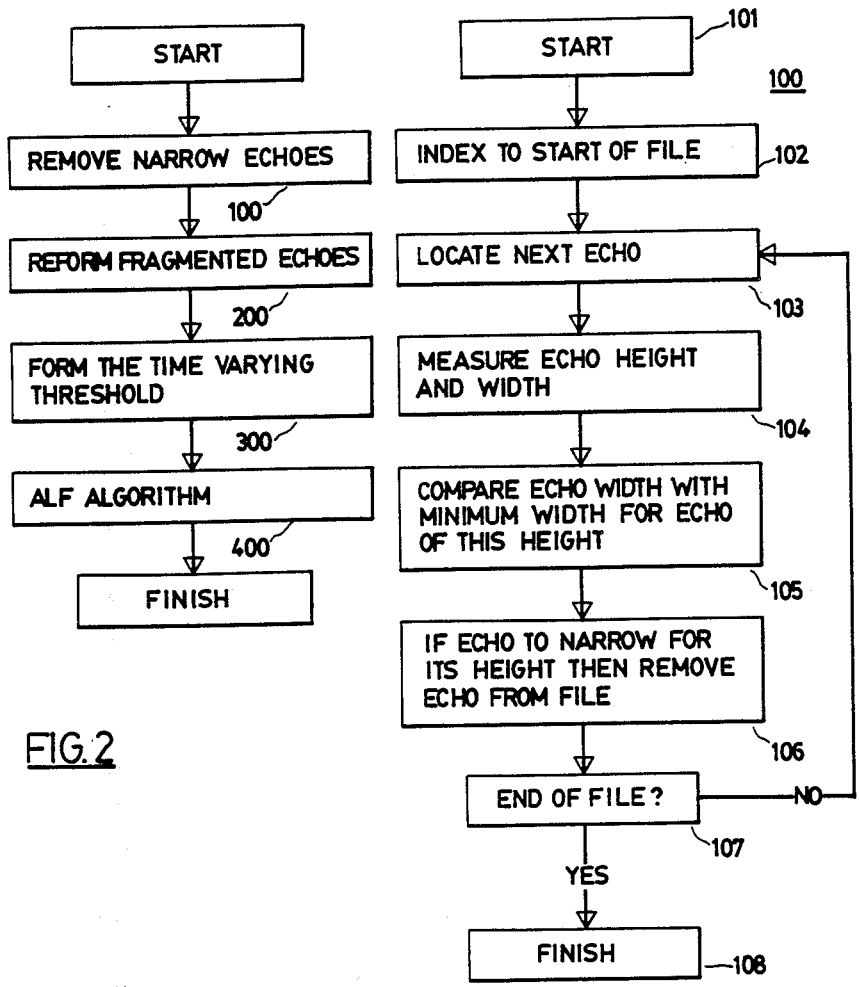
FIGS. 2-6 are flow diagrams illustrating the processing of an echo profile stored in memory so as to identify a desired echo.

The echo profile processing routine of the present invention is outlined in FIG. 2, and comprises four main stages. It is utilized in the processing of echo profiles generated by "long" shots, i.e. shots employing relatively longer transmitted pulses to detect echoes beyond a certain limited distance from the transducer, as opposed to "short" shots utilized for the detection of close-in echoes.

Figure 7:
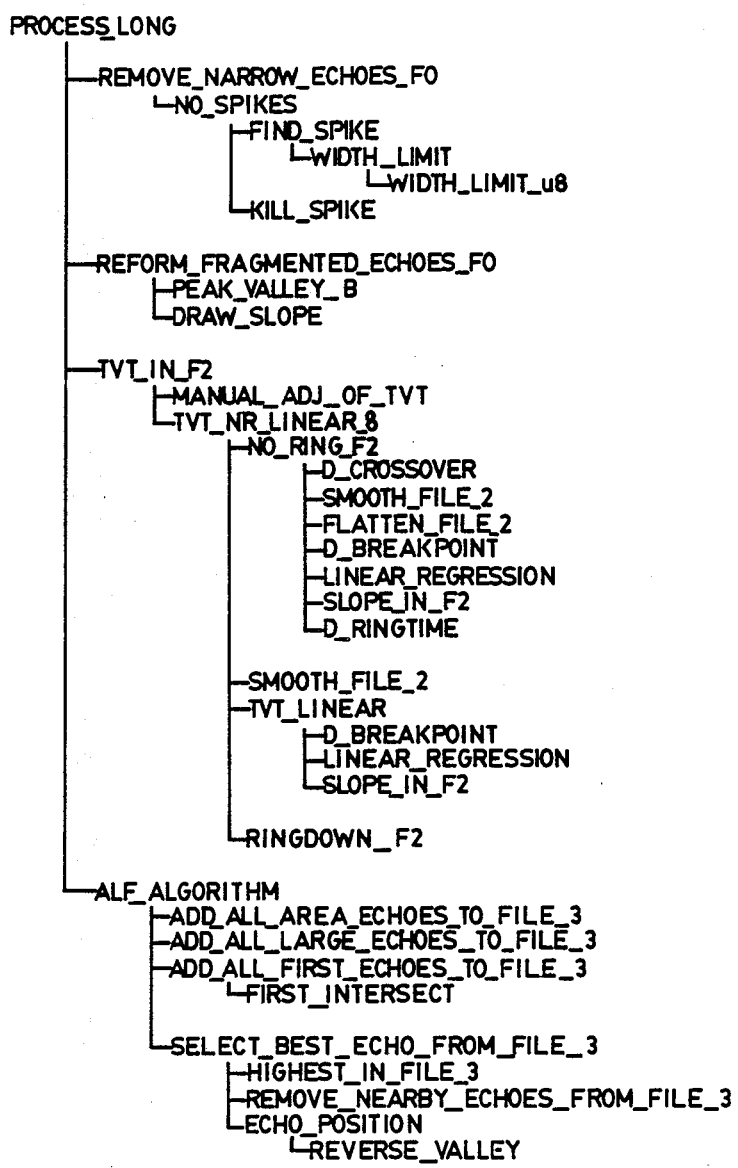
FIG. 7 is a tree diagram illustrating the structure of the processing routine.

The processing stages are described further with reference to FIGS. 2 and 7. Source code of the various subroutines mentioned in this and subsequently described stages of processing is found in the Appendix to this specification; this source code is written in assembly language for the Motorola (trade mark) 6809 microprocessor. The processing stages are called successively within a portion of a main routine labelled PROCESS_LONG (see FIG. 7), operating on a file F0 which contains a stored digitized echo profile to be processed. After the first two stages 100 and 200 of processing, a file F1 is loaded from F0 and processed in stage 300 to provide a file F2 which contains a digitized time varying threshold or TVT. In the final stage 400, the files F1 and F2 are compared in various ways to select a true echo.

The stage 100 is described in more detail with reference to FIG. 3. The start and finish 101 and 108 of the stage are encompassed within a subroutine labelled REMOVE_NARROW_ECHOES_F0 which in turn calls a subroutine labelled NO_SPIKES. This subroutine indexes to the beginning of the file F0 at (step 102), and calls a subroutine FIND_SPIKE which searches through the file F0 looking for peaks in the echo profile (step 103), and calling nested subroutines WIDTH_LIMIT and WIDTH_LIMIT_US to measure the peaks (step 104) and test the width of such peaks against values looked up in a table (step 105). When a peak is located satisfying preselected narrowness criteria, as determined by preset parameters, a subroutine KILL_SPIKE is called (step 106), which modifies the profile by maintaining the sample amplitude constant for samples from the detected beginning of the spike to either the detected end of the spike or an intersection with the original profile, whichever occurs first. Until the end of the file is detected at (step 107), the FIND_SPIKE and KILL_SPIKE routines are then called repeatedly so as to eliminate narrow peaks from the echo profile file, and convert it from a form as shown in FIG. 8 to a form as shown in FIG. 9. Although the embodiment described selects peaks to be removed based on preset parameters, these parameters could if desired be calculated from an examination of the echo profile.

Figure 10:
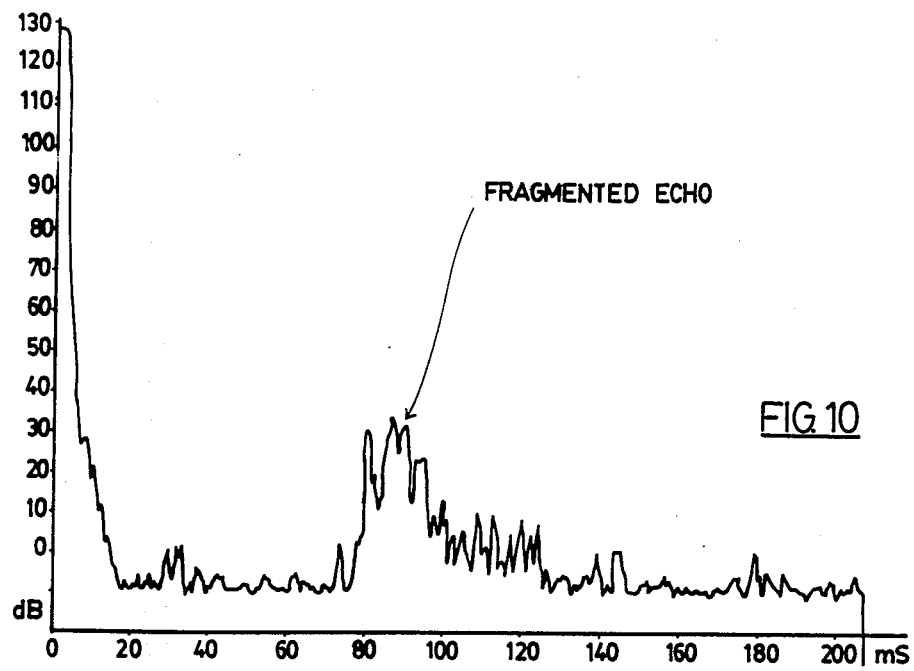
Figure 11:
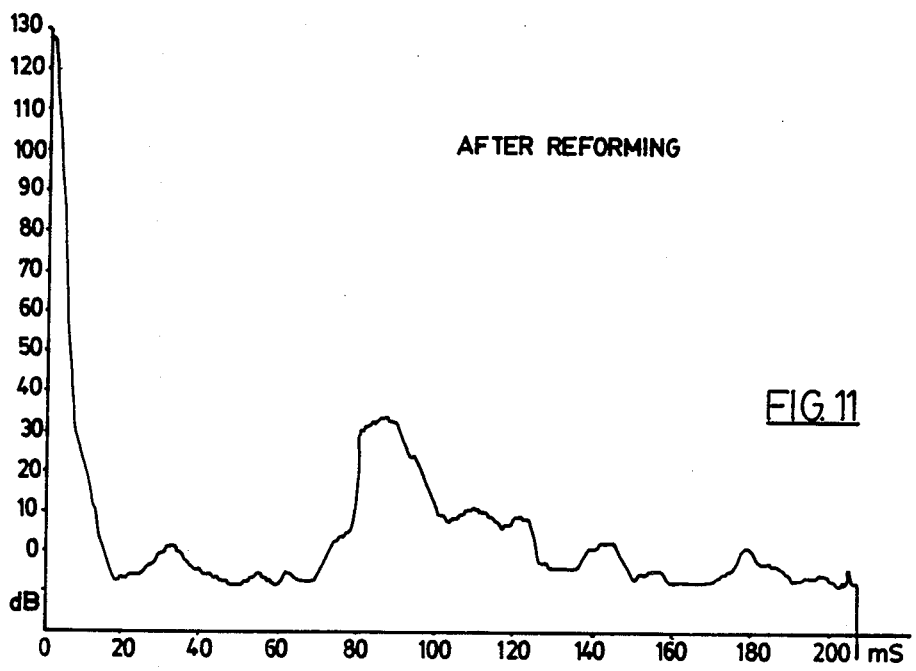

The next stage 200 reforms echoes which may be fragmented due to steps in the surface of material in a bin, as already discussed above. I have found that this can be achieved by removing narrow dips in the stored echo profile, the maximum width of a dip to be removed being determined by setting of a parameter. This procedure tends to convert a cluster of fragmented echoes into a single, wide echo which is more readily recognizable as a true echo, as will be seen from a comparison of FIGS. 10 and 11, which shown an echo profile respectively before and after reforming.

Figure 4:
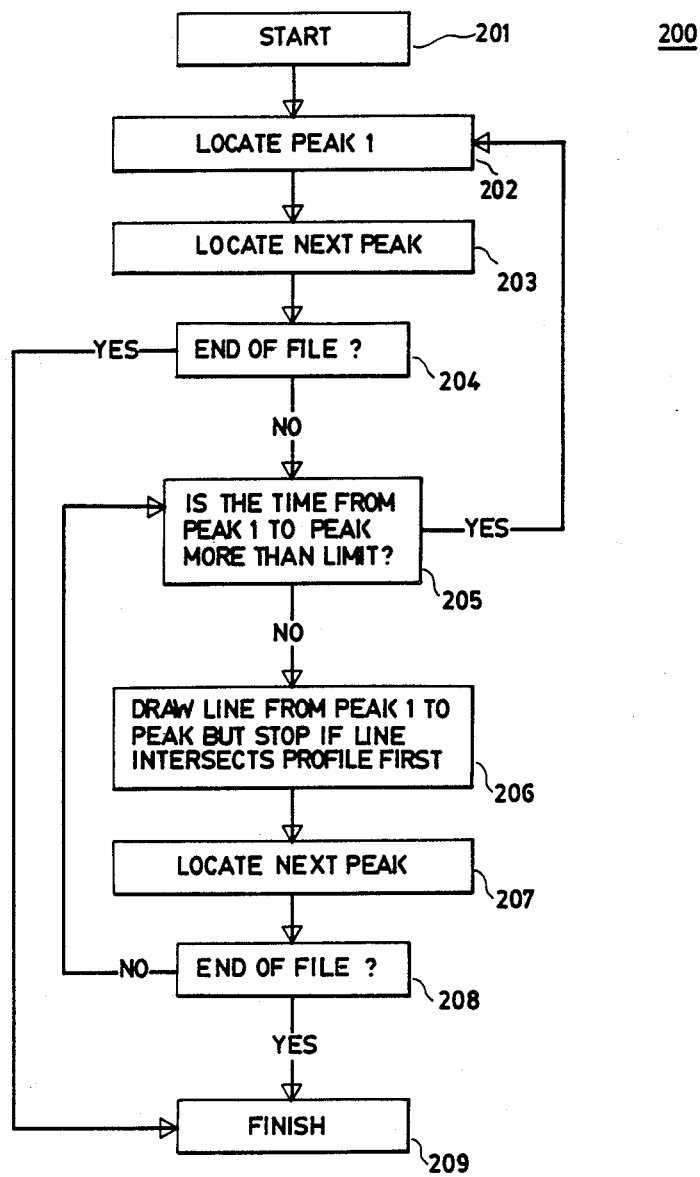

Referring to FIGS. 4 and 7, the stage 200 is performed by the subroutine REFORM_FRAGMENTED_ECHOES_F0. This subroutine starts at 201 (see FIG. 4), and removes dips in the profile by locating peaks in the profile, and drawing lines of predetermined slope from each peak to the start of each following peak which is no further than a predetermined distance from the first peak. Starting at the beginning of the file, peaks followed by valleys of more than a predetermined depth are located by the subroutine PEAK_VALLEY_B (see step 202 in FIG. 4) and the distance to a following peak is determined (step 203) (unless the end of the file is reached first (see step 204) in which case the subroutine ends (step 209). If the distance between the peaks is determined to be more than a precalculated distance (step 205), the routine loops to step 202, otherwise a subroutine DRAW_SLOPE is called (step 206) to perform the line drawing function. At the end of the drawn line, a search for a following peak is recommenced (step 207), and the subroutine checks for the end of file (step 208) and loops to step 205 unless the end of the file has been reached in which case the subroutine ends at step 209.

Figure 5:
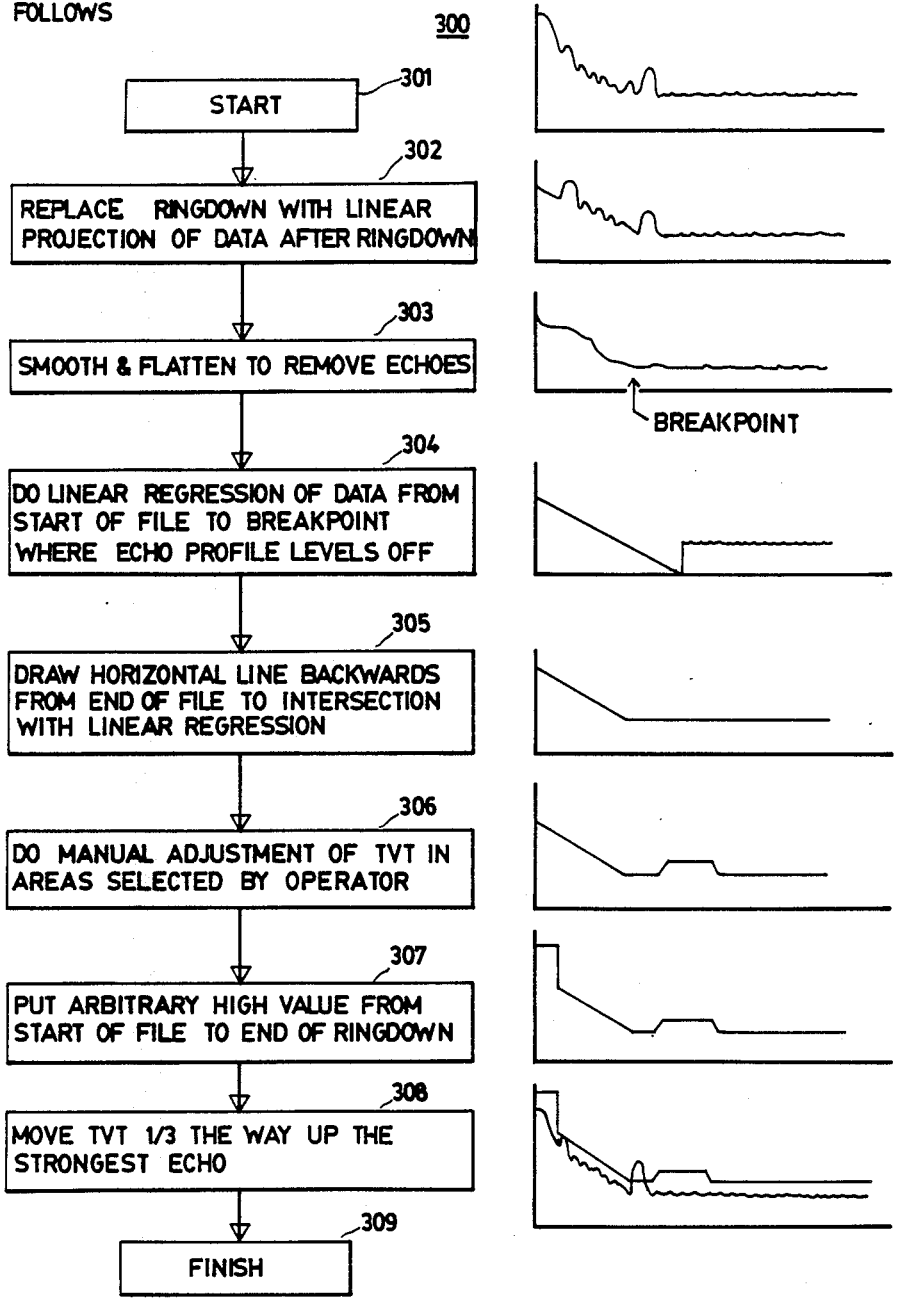
Figure 6:
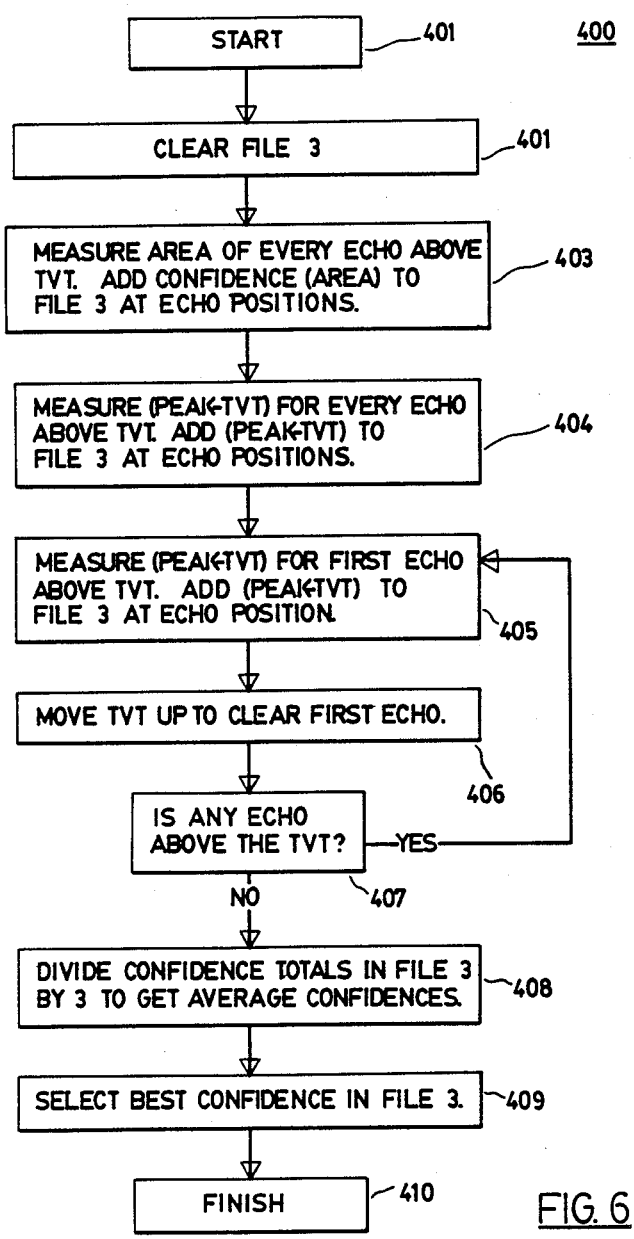

The stage 300 is set forth in FIG. 5, in which the diagrams on the right hand side illustrate the successive stages in formation of a time varying threshold (TVT) from a copy of the echo profile taken from file 1. In practice, the routine illustrated in FIG. 5 represents a subroutine TVT_NR_LINEAR_S which is just one of several different routines for deriving the TVT from the echo profile, the subroutine being selected from a table of alternative subroutines in an initial stage 301 of the subroutine TVT_IN_F2 (see FIG. 7) according to a preset control parameter. Other routines in the table may be those disclosed in U.S. Pat. No. 4,596,144, such as a TVT produced by smoothing of the echo response which may give optimum results in certain applications, or modifications of the routine to be described. A final stage 308 of the stage 300, also included in subroutine TVT_IN_F2 adjusts the position of the TVT relative to the echo profile so as to move it ⅓ (typically) way up the strongest echo. A further subroutine MANUAL_ADJ_OF_TVT called from TVT_IN_F2 enables an operator to make local manual adjustment (step 306) to the TVT to compensate for known spurious echoes in a bin being monitored. By referring to test echo profiles, the location and magnitude of such echoes can be determined, and the TVT profile adjusted upwardly to ensure that such echoes are not selected as true echoes, whilst still permitting a true echo superimposed on a spurious echo to be detected. The subroutine MANUAL_ADJ_OF_TVT permits any segment of the TVT profile to be selected and the sample values in that segment to be altered by a selected increment.

The subroutine TVT_NR_LINEAR_S calls various further subroutines NO_RING_F2, SMOOTH_FILE_2, TVT_LINEAR and RINGDOWN_F2. The subroutine NO_RING_F2 performs the functions of step 302 in FIG. 5. The first part of the echo profile is initially replaced by a line from its start to the end of a "short shot" zone selected by a subroutine D_CROSSOVER. This zone is that within which ranging would normally be carried out using a shortened transmit pulse and the technique described in my co-pending application No. 916,013 for detecting close-in echoes in bins that are nearly full. The present routine, which is intended for detecting longer range echoes, makes no attempt to locate echoes within the "short shot" zone. The line which replaces this initial portion of the profile is a horizontal line at a level corresponding to the lowest point on the portion replaced. The remaining data is then subjected to smoothing and flattening routines SMOOTH_FILE_2 and FLATTEN_FILE_2 to remove echoes from the profile. The smoothing routine averages adjacent points, the number of points being averages being selectable to adjust the degree of smoothing. The flattening routine flattens all rising portions of the profile to remove echoes.

A subroutine D_BREAKPOINT then locates the breakpoint on the profile at which the overall downward gradient of the profile cease, and a subroutine LINEAR_REGRESSION performs a linear regression of data from the portion of the file preceding the breakpoint. A subroutine SLOPE_IN_F2 then draws in file F2 a profile corresponding to the slope of the linear regression. The profile in file F2 is compared with the initial echo profile in file F1 and the portion of file F1 preceding its first intersection with the linear regression profile in file F2 is replaced by the corresponding portion of the file F2, i.e. the ringdown portion of the echo profile is replaced by a linear regression.

This modified file F2 is then again processed using the subroutines SMOOTH_FILE_2 (step 303) and a subroutine TVT_LINEAR which latter subroutine calls the subroutines D_BREAKPOINT, LINEAR_REGRESSION and SLOPE_IN_F2, which again plot a linear regression based on the portion of the profile prior to the breakpoint (step 304). The subroutine TVT_LINEAR then draws a horizontal line backwards from the end of the file to an intersection with the linear regression (step 305), to produce a time varying threshold.

Finally, the initial ringdown portion of the threshold profile is adjusted to a level higher than the level of any predicted echo profile during this portion by the subroutine RINGDOWN_F2.

In stage 400, the time varying threshold developed in file F2 by the subroutine TVT_IN_F2, whether using the technique just described or alternative or modified techniques, is compared with the echo profile processed in stages 100 and 200 and stored in file F1, and a selection made of a probable true echo based on various criteria or a combination of them, under control of the subroutine ALF_ALGORITHM. This subroutine starts at step 401 and commences by clearing a file F3 (step 402) to receive echo data developed during subsequent steps 403, 404, 405, although a parameter can be preset to determine which of these steps are in fact carried out. Normally all three will be used, although one or two may be omitted if they produce consistently less reliable data in a particular application.

In step 403, implemented by a subroutine ADD_ALL_AREA_ECHOES_TO_FILE_3, a figure proportional to the area of every echo in the profile protruding above the TVT is added to file F3 in a location corresponding to the position of the peak concerned. The subroutine compares both files, starting at the beginning, looking for an initial rising intersection of the echo profile with the TVT. It then sums and stores the area between the curves until a falling intersection is reached, and also detects and stores the location of the last sample having a peak value between the intersections. A value equal to a fraction typically ⅛ of the area is stored in a location in the file F3 corresponding to the location of the last sample having the peak value. This procedure is then repeated for each pair of rising and falling intersections until the end of the files F1 and F2 is reached.

In step 404, implemented by a subroutine ADD_ALL_LARGE_ECHOES_TO_FILE_3, a similar procedure is utilised, except that instead of summing the area beneath the echo profile between each pair of intersections, the height of each peak above the TVT is determined and stored.

In step 405, implemented by a subroutine ADD_ALL_FIRST_ECHOES_TO_FILE_3, a similar procedure to step 404 is again utilized, except when a peak has been detected and its value stored by the subroutine FIRST_INTERSECT, the TVT is raised to intersect that peak before searching for a following peak (step 406), until no further peak is detected (step 407). The height of each peak detected above the adjusted TVT level is determined and stored.

After these steps 403-405 (or any selected subset of them), the values stored in file F3, whose positions represent the echoes detected and whose magnitudes represent the sum of echoes detected at a particular position are divided by the number of steps performed (step 408) and subjected to a routine SELECT_BEST_ECHO_FROM_FILE_3 to determine the position of the true echo (step 409) before returning (step 410). As a first stage of determining the echo position, a subroutine HIGHEST_IN_FILE_3 locates the highest value in file F3, and then a routine REMOVE_NEARBY_ECHOES_FROM_FILE_3 clears portions typically ⅛ of the length of the file, on either side of this highest value, whereafter the highest remaining echo in the file is detected. The difference between the highest value and next highest non-adjacent value represents the degree of confidence applicable to the echo detection routine. A subroutine ECHO_POSITION is then used to redetermine the position of the echo identified by the highest value in file F3, by comparing the echo profile in file F1 and the TVT curve from file F2 so as to identify that intersection most nearly preceding the position of the highest value in F3, locating the valley in the profile preceding the intersection, deriving a sill value which is the average of the valley value and the peak value, and determining the intersection of the sill and the echo profile following the valley.

APPENDIX

An Appendix containing a source code listing of routines utilized by the system of the present invention attached hereto and to which specific reference has been made above. The Appendix contains subject matter which is copyright. A limited license is granted to anyone who requires a copy of the program disclosed therein for purposes of understanding or analyzing the present invention, but no license is granted to make a copy for any other purpose, including the loading of a processing device with code in any form or language.

```
PROCESS_LONG:           ; F0 = ECHO PROFILE

PSHS    X,Y,D,CC

LBSR    REMOVE_NARROW_ECHOES_F0
        LBSR    REFORM_FRAGMENTED_ECHOES_F0

LBSR    COMPRESS_F0     ; FILE 1 = FILE 0

LBSR    TVT_IN_F2
```

```
            LBSR    ALF_ALGORITHM   ; RETURNS A = CONFIDENCE
                                    ;         B = SILL
                                    ;         X = ECHO POSITION IN # OF SAMPLES
                                    ;         Y = PEAK POINTER IN FILE 1
                                    ;         F2 = TVT CURVE

PROL1       LBSR    STORE_ECHO_DATA ; STORE ECHO POSITION, PEAK, AND CONFIDENCE

CMPA    EP62            ; IF A < THRESHOLD THEN A=0
            BHS     PROL5
            LDA     #0

PROL5       LBSR    TEST_RINGDOWN   ; IF NO RINGDOWN THEN A=0

PROL6       LBSR    AGITATOR        ; STORES EP86,87 or RETURNS A=0
            LBSR    ECHO_TIME       ; STORES EP93

LBSR    MARK_IN_F3
            LBSR    WINDOW_IN_F4

PULS    X,Y,D,CC
            RTS

REMOVE_NARROW_ECHOES_F0:

PSHS    X,A,CC
            LDX     #FS0
            LDA     EP36            ; A = EP36
            BSR     NO_SPIKES
            PULS    X,A,CC
            RTS

NO_SPIKES:                          ; REMOVE SPIKES/ECHOES FROM 2400 SAMPLE HIGH RESOLUTION FILE
                                    ;     X = PNTER TO FILE START
                                    ;     A = 0 TO 6 FOR WIDTH OF SPIKE TO BE REMOVED
                                    ;             (see table in WIDTH_LIMIT_US)

PSHS    X,Y,D,CC,U
            LEAS    -2,S

TSTA                    ; IF A = 0 THEN QUIT
            BEQ     NSPK2

TFR     D,U             ; MSBYTE OF U = A

TFR     X,D             ; 0,S/1,S = FILE END + 1 = X + 2400
            ADDD    #2400
            STD     ,S

NSPK1       LBSR    FIND_SPIKE      ; FIND AND KILL ALL SPIKES
            LBSR    KILL_SPIKE      ; UNTIL END OF FILE REACHED.
            CMPX    ,S
            BNE     NSPK1

NSPK2       LEAS    2,S
            PULS    X,Y,D,CC,U
            RTS
```

```
FIND_SPIKE:        ; INPUT   X = PNTER TO START SEARCH
                   ;         0,S/1,S = FILE END + 1
                   ;         MSBYTE OF U = WIDTH LIMIT PARAMETER
                   ; OUTPUT  X = PNTER TO START OF SPIKE (VALLEY)
                   ;         X = 0,S IF NO SPIKES FOUND

PSHS    Y,D,CC
        LEAS    -8,S

LDY     0+15,S           ; 0,S = FILE END + 1
        STY     ,S

FSPK1   LBSR    END_OF_VALLEY    ; MEASURE SPIKE CHARACTERISTICS
        CMPX    ,S               ; OR QUIT IF EOF REACHED BEFORE START OF SPIKE
        BEQ     FSPK8            ;     2,S = VALLEY PNTER
        STA     4,S              ;     4,S = VALLEY
        STX     2,S              ;     5,S = PEAK
        LBSR    END_OF_PEAK      ;     6,S = PEAK PNTER
        STA     5,S
        STX     6,S

LDA     5,S              ; A = MIDPOINT OF ECHO RISING EDGE
        SUBA    4,S              ; X = POINTER TO MIDPOINT OF ECHO RISING EDGE
        BSR     WIDTH_LIMIT      ; Y = MIDPOINT WIDTH LIMIT IN SAMPLES
        LDA     5,S
        ADDA    4,S
        RORA
        LDX     2,S
        LEAX    -1,X
FSPK3   LEAX    1,X
        CMPX    ,S
        BEQ     FSPK8
        CMPA    ,X
        BHI     FSPK3

FSPK4   LEAX    1,X              ; INCREMENT X & DECREMENT Y UNTIL
        CMPX    ,S               ;     IF EOF   THEN X=VALLEY AND QUIT
        BEQ     FSPK6            ;     IF Y=0   THEN X=PEAK & LOOP TO FSPK1
        LEAY    -1,Y             ;     IF A>,X  THEN X=VALLEY AND QUIT
        BEQ     FSPK5
        CMPA    ,X
        BHI     FSPK6
        BRA     FSPK4
FSPK5   LDX     6,S
        BRA     FSPK1
FSPK6   LDX     2,S

FSPK8   LEAS    8,S
        PULS    Y,D,CC
        RTS

WIDTH_LIMIT:       ; INPUT;  A = SPIKE/ECHO HEIGHT (PEAK-VALLEY) IN dB,
                   ;         MSBYTE OF U = WIDTH LIMIT PARAMETER
                   ; OUTPUT; Y = MIDPOINT WIDTH THRESHOLD IN SAMPLES

PSHS    X,D,CC
        LEAS    -6,S

LEAY    ,S               ; Y = LIMIT IN uS / SAMPLE RATE
```

```
        CLR     ,Y
        CLR     1,Y
        BSR     WIDTH_LIMIT_uS
        STD     2,Y
        LEAX    4,S
        CLR     ,X
        LDA     SAMPLE_RATE
        STA     1,X
        LBSR    BINARY_DIVIDE   ; ,Y = ,Y / ,X
        LDY     2,Y

LEAS    6,S
        PULS    X,D,CC
        RTS

WIDTH_LIMIT_uS: ; INPUT;  A = SPIKE/ECHO HEIGHT (PEAK-VALLEY) IN dB,
                ;         MSBYTE OF U = WIDTH LIMIT PARAMETER
                ; OUTPUT; D = MIDPOINT WIDTH THRESHOLD IN uS

; 44 KHZ, 40~   ; SPIKE WIDTH =  72 + dB x 5.9
                        ; ECHO  WIDTH = 916 + dB x 4.8
                        ; THRESHOLD   = 500 + dB x 5

; 21 KHZ, 36~   ; SPIKE WIDTH =  156 + dB x 11.1
                        ; ECHO  WIDTH = 1217 + dB x 45
                        ; THRESHOLD   =  600 + dB x 28

; 13 KHZ, 22~   ; SPIKE WIDTH =  224 + dB x 18.4
                        ; ECHO  WIDTH = 1033 + dB x 67.5
                        ; THRESHOLD   =  600 + dB x 37

PSHS    X,CC
        LEAS    -1,S

STA     ,S              ; 0,S = ECHO HEIGHT IN DB

LEAX    WLUT,PCR        ; X = POINTER TO TABLE

TFR     U,D             ; X = X + 12*LIMIT, LIMIT = 0 to 6
        CMPA    #6              ; hence X points to row in table
        BLS     WLU1
        LDA     #6
WLU1    LDB     #12
        MUL
        LEAX    D,X LDA     EP98            ; X = X + 4*(EP98-1), EP98 = 1 to 3
        CMPA    #3              ; hence x points to column in table
        BLS     WLU2
        LDA     #3
WLU2    DECA
        LDB     #4
        MUL
        LEAX    D,X LDA     ,S              ; D = 0,S * 3,X + 0,X/1,X
        LDB     3,X             ;   = midpoint width threshold in uS
```

```
            MUL
            ADDD    ,X

LEAS    1,S
            PULS    X,CC
            RTS

;                   EP98 = 1        EP98 = 2        EP98 = 3

WLUT        DW      0,0,            0,0,            0,0             ; LIMIT = 0
            DW      500,5,          600,28,         600,37          ; LIMIT = 1
            DW      916,5,          1217,45,        1033,67         ; LIMIT = 2
            DW      1374,7,         1825,67,        1550,101        ; LIMIT = 3
            DW      2061,11,        2738,101,       2324,152        ; LIMIT = 4
            DW      3091,16,        4107,152,       3486,228        ; LIMIT = 5
            DW      4637,24,        6161,228,       5230,255        ; LIMIT = 6

KILL_SPIKE:         ; X = PNTER TO START OF SPIKE
                    ; 0,S/1,S = FILE END + 1

PSHS    X,D,CC
            LEAS    -6,S

LDY     0+13,S          ; 0,S/1,S = FILE END + 1
            STY     ,S              ; 2,S/3,S = START OF SPIKE
            STX     2,S

LBSR    END_OF_PEAK     ; 4,S/5,S = END OF SPIKE
            LBSR    END_OF_VALLEY
            STX     4,S

LDX     2,S             ; DRAW HORIZONTAL LINE FROM 2,S/3,S TO
            LDA     ,X              ;     4,S/5,S or UNTIL SPIKE < LINE
            LEAX    -1,X            ;     which ever comes first
KSPK1       LEAX    1,X
            CMPA    ,X
            BHI     KSPK2
            STA     ,X
            CMPX    4,S
            BNE     KSPK1

KSPK2       LEAS    6,S
            PULS    X,D,CC
            RTS

REFORM_FRAGMENTED_ECHOES_F0:
            ; BY DRAWING LINES FROM END OF EACH PEAK TO START OF ALL
            ; NEXT PEAK WHICH ARE NO FARTHER THAN EP33 * MULT_FACTOR
            ; AND STARTING EACH TIME FROM THE END OF THE FARTHEST LINE
            ; WHICH WAS FULLY COMPLETED.  USES ONLY FILE 0.
            ;
            ; INPUT  FILE 0 = ECHO PROFILE
            ; OUTPUT FILE 0 = REFORMED ECHO PROFILE

PSHS    X,Y,D,CC
            LEAS    -14,S

LDB     EP33            ; IF EP33 = 0  THEN QUIT
```

```
        LBEQ    RFE9
        CLRA                        ; 10,S/11,S = EP33 * MULT_FACTOR
        LBSR    D_BY_MULT_FACTOR
        STD     10,S

LDA     #0                  ; 0,S/1,S = FILE 0 END + 1
        LBSR    FILE_POINTERS       ; X = FIRST VALLEY IN FILE 0 WITH P-V > EP75
        STY     ,S                  ;     OR CROSSOVER, WHICHEVER IS FIRST
        LDB     EP75
        LBSR    PEAK_VALLEY_B
        STX     2,S
        LBSR    D_CROSSOVER
        LBSR    D_BY_MULT_FACTOR
        ADDD    #F50
        CMPD    2,S
        BHS     RFE1
        TFR     D,X

RFE1    LBSR    END_OF_PEAK         ; END OF FIRST PEAK
        CMPX    ,S
        BEQ     RFE9
        STX     2,S
        STA     4,S

LBSR    END_OF_VALLEY
        CMPX    ,S
        BEQ     RFE9

LBSR    START_OF_PEAK       ; START OF SECOND PEAK
        CMPX    ,S
        BEQ     RFE9
        STX     12,S                ; 12,S = INDEX

RFE2    STX     6,S                 ; STORE PEAK DATA
        STA     8,S

LDD     6,S                 ; IF PEAK - PEAK 1 > EP33 * MULT_FACTOR
        SUBD    2,S
        CMPD    10,S                ;     THEN    INDEX BACK TO 12,S
        BLS     RFE3                ;             AND LOOP TO RFE1
        LDX     12,S
        BRA     RFE1
RFE3    LDX     2,S                 ; DRAW LINE FROM PK1 TO PEAK
        LDY     6,S
        LDA     4,S
        LDB     8,S
        LBSR    DRAW_SLOPE

BCS     RFE4                ; IF SLOPE COMPLETED THEN 12,S = END OF SLOPE
        STY     12,S

RFE4    LDX     6,S                 ; INDEX TO PEAK (end of slope)

LBSR    END_OF_VALLEY
        CMPX    ,S
        BEQ     RFE9

LBSR    START_OF_PEAK       ; START OF NEW PEAK
```

```
                CMPX        ,S
                BEQ         RFE9
                BRA         RFE2                ; LOOP TO RFE2

RFE9            LEAS        14,S
                PULS        X,Y,D,CC
                RTS

PEAK_VALLEY_B:  ; FIND NEXT VALLEY WITH PEAK-VALLEY >= B
                ;               X = POINTER 1 TO BEGIN SEARCH
                ;       0,S/1,S = FILE END + 1
                ;               B = MINIMUM PEAK-VALLEY
                ; OUTPUT        X = POINTER TO VALLEY or EOF+1 if nothing found
                ;               A = VALLEY              or 0           "
                ;               Y = POINTER TO PEAK     or EOF+1       "
                ;               B = PEAK                or 0           "

PSHS        CC
                LEAS        -7,S

STB         6,S                 ; 6,S = B
                LDD         10,S                ; 0,S/1,S = FILE END + 1
                STD         ,S

PV2             LDB         6,S                 ; LOCATE VALLEY, RIPPLE REJ = 5,S
                LBSR        TRUE_VALLEY         ; IF EOF THEN FAIL ELSE
                CMPX        ,S                  ;    3,S = VALLEY
                BEQ         PV8                 ;    4,S/5,S = X = VALLEY POINTER
                STA         3,S
                STX         4,S

LDB         #4                  ; LOCATE PEAK, RIPPLE REJ = 4 dB
                LBSR        TRUE_PEAK           ; IF EOF THEN FAIL ELSE
                CMPX        ,S                  ;    2,S = A = PEAK and X = PEAK POINTER
                BEQ         PV8
                STA         2,S SUBA        3,S                 ; IF P-V < 6,S  THEN  TRY AGAIN
                BCC         PV3
                CLRA
PV3             CMPA        6,S
                BLO         PV2

TFR         X,Y                 ; Y = X = PEAK POINTER
                LDB         2,S                 ; B = PEAK
                LDX         4,S                 ; X = 4,S = VALLEY POINTER
                LDA         3,S                 ; A = VALLEY
                BRA         PV9

PV8             LDA         #0                  ; A=B=0   FAILURE
                LDB         #0                  ; Y=X
                TFR         X,Y

PV9             LEAS        7,S
                PULS        CC
                RTS
```

```
DRAW_SLOPE:        ; FROM (X,A) TO (Y,B)
                   ; EXIT WITH CARRY SET IF ANY POINT LOWER THAN EXISING POINT.
                   ; OTHERWISE COMPLETE THE LINE AND EXIT WITH CARRY CLEAR

PSHS    X,Y,U,D
          LEAS    -15,S

STA     6,S            ; 6,S = A
          STB     8,S            ; 8,S = B
          STX     10,S           ; 10,S/11,S = X
          STY     12,S           ; 12,S/13,S = Y

DSLP1     LDD     12,S           ; IF Y-1 <= X THEN QUIT
          SUBD    #1
          SUBD    10,S
          BLS     DSLP9

CLR     14,S           ; 4,S/5,S = SLOPE * 256
          LDA     8,S            ;         = !RISE!/RUN * 256
          SUBA    6,S            ;         = !B-A!/(Y-X) *256
          BCC     DSLP2
          COM     14,S           ; 14,S = 0 IF POSITIVE SLOPE
          LDA     6,S
          SUBA    8,S
DSLP2     CLRB
          CLR     2,S
          CLR     3,S
          STD     4,S
          LDD     12,S
          SUBD    10,S
          STD     ,S
          LEAX    ,S
          LEAY    2,S
          LBSR    BINARY_DIVIDE  ; ,Y = ,Y / ,X

LDU     10,S           ; U = 10,S  start of slope

DSLP3     LEAU    1,U            ; U = U + 1

CMPU    12,S           ; IF U = 12,S THEN EXIT WITH CARRY CLEAR
          BEQ     DSLP9

TFR     U,D            ; IF SLOPE POSITIVE
          SUBD    10,S           ;     THEN
          STD     ,S             ;                    SLOPE * (Y - 10,S)
          LEAY    ,S             ;         B = 6,S + ------------------
          LEAX    4,S            ;                          256
          LBSR    BINARY_MULTIPLY ;
          LDB     6,S            ;     ELSE
          ADDB    2,S            ;                    SLOPE * (Y - 10,S)
          TST     14,S           ;         B = 6,S - ------------------
          BEQ     DSLP4          ;                          256
          LDB     6,S
          SUBB    2,S

DSLP4     CMPB    ,U             ; IF B < ,U  THEN EXIT WITH CARRY SET
          BLO     DSLP9          ;            ELSE   ,U = B
          STB     ,U
```

```
                BRA     DSLP3               ; LOOP TO DSLP3

DSLP9       LEAS    15,S
                PULS    X,Y,U,D
                RTS

TVT_IN_F2:          ; FORM TVT IN F2, USING ECHO PROFILE IN F1
                        ; USES F6 AS A WORK SPACE
                        ; IF FILE_SIZE < 130 THEN FILE 2 AND 6 ARE EXTENDED TO 130.
                        ; METHOD SET BY P79

PSHS    X,Y,D,CC

LDA     #$12                ; FILE 2 = FILE 1
                LBSR    COPY_FILE

LDA     EP79                ; MASSAGE F2 PER EP79
                CMPA    #6
                BLS     TVT1
                LDA     #6
    TVT1        LSLA
                LEAX    TVT9,PCR
                JSR     [A,X]

LDB     #85                 ; MOVE TVT 1/3 WAY UP STRONGEST ECHO
                LBSR    SET_HOVER

LBSR    MANUAL_ADJ_OF_TVT

PULS    X,Y,D,CC
                RTS
                                            ; ON ENTERING THESE PROGRAMS;
                                            ; F1=F2=ECHO PROFILE

TVT9        DW      TVT_NONE            ; 0
                DW      TVT_NR_LINEAR_S     ; 1
                DW      TVT_NR_LINEAR_F     ; 2
                DW      TVT_NR_SMOOTH       ; 3
                DW      TVT_NR_FLAT         ; 4
                DW      TVT_SMOOTH          ; 5
                DW      TVT_FLAT            ; 6

MANUAL_ADJ_OF_TVT:  ; ADJUST TVT IN FILE 2 UP/DOWN ACCORDING TO EP92.
                        ; EP92 IS 50 BYTES CORRESPONDING TO FILE 2 DIVIDED
                        ; INTO 50 EQUAL SEGMENTS.

PSHS    X,Y,D,CC
                LEAS    -12,S

LDA     #2                  ; 10,S/11,S = FILE 2 START
                LBSR    FILE_POINTERS       ;  2,S/3,S  = FILE 2 END + 1
                STY     2,S
                STX     10,S

LDD     #1                  ; 4,S/5,S = 0 = SEGMENT COUNTER
                STD     4,S

MAT1        LDD     FILE_SIZE           ;                    4,S/5,S = FILE_SIZE
```

```
           STD    6,S             ; 0,S/1,S = FS2 + ---------------------
           LEAY   6,S             ;                           50
           LEAX   4,S             ;
           LBSR   BINARY_MULTIPLY ;           = END OF SEGMENT + 1
           LEAX   MAT10,PCR       ;
           LBSR   BINARY_DIVIDE   ;           with the restriction ... <= 2,S/3,S
           LDD    #FS2
           ADDD   8,S
           CMPD   2,S
           BLS    MAT2
           LDD    2,S
MAT2       STD    ,S LDB    5,S             ; 6,S/7,S = SEGMENT VALUE FROM EP92
           LDY    #EP92           ;           (corresponding to segment counter)
           DECB
           LDB    B,Y
           CLR    6,S
           STB    7,S LDX    10,S            ; X = 10,S/11,S = START OF SEGMENT
           CMPX   ,S
           BEQ    MAT6

MAT3       CLRA                   ; ,X+ = ,X + 6,S/7,S - 100
           LDB    ,X              ;
           ADDD   6,S             ;       UNTILL X = 0,S/1,S
           SUBD   #100
           BCC    MAT4
           LDD    #0
MAT4       CMPD   #150+30
           BLS    MAT5
           LDD    #150+30
MAT5       STB    ,X+
           CMPX   ,S
           BNE    MAT3

MAT6       STX    10,S            ; 10,S/11,S = X = START OF NEXT SEGMENT
           LDD    4,S             ; 4,S/5,S = 4,S/5,S + 1
           ADDD   #1
           STD    4,S
           CMPD   #50             ; IF 4,S/5,S <= 50 THEN LOOP TO MAT1
           BLS    MAT1            ;                        for next segment

LEAS   12,S
           PULS   X,Y,D,CC
           RTS

MAT10      DW     50

TVT_NR_LINEAR_S:          ; REMOVE RINGDOWN, SMOOTH,
                          ; THEN DO LINEAR REGRESSION

LBSR   NO_RING_F2
           LDA    #6
           LBSR   SMOOTH_FILE_2
           LBSR   TVT_LINEAR
           LBSR   RINGDOWN_F2
           RTS
```

```
NO_RING_F2:        ;  INPUT;    FILE 2 = ECHO PROFILE
                   ;            FILE 1 = ECHO PROFILE
                   ;
                   ; OUTPUT;    FILE 2 = ECHO PROFILE WITHOUT RINGDOWN
                   ;            RINGTIME = INDEX TO FIRST SAMPLE AFTER RINGDOWN

PSHS    X,Y,D,CC
           LEAS    -6,S

LDA     #2                  ; X = 2,S/3,S = FILE 2 START
           LBSR    FILE_POINTERS       ; Y = 0,S/1,S = FILE 2 END + 1
           STX     2,S
           STY     ,S

LBSR    D_CROSSOVER         ; REPLACE ECHO PROFILE WITH HORIZONTAL LINE
           ADDD    2,S                 ; FROM START TO D_CROSSOVER AT LEVEL EQUAL
           STD     4,S                 ; TO LOWEST LEVEL BETWEEN START & D_CROSSOVER
           LDA     #250
NOR1       CMPA    ,X+
           BLS     NOR2
           LDA     -1,X
NOR2       CMPX    4,S
           BNE     NOR1
NOR3       STA     ,-X
           CMPX    2,S
           BNE     NOR3

LDA     #5                  ; 32 POINT SMOOTHING OF FILE 2
           LBSR    SMOOTH_FILE_2
           LBSR    FLATTEN_FILE_2

LBSR    D_CROSSOVER         ; X = 2,S/3,S + CROSSOVER = START OF L.R.
           ADDD    2,S
           TFR     D,X

LBSR    D_BREAKPOINT        ; Y = 2,S/3,S + BREAKPOINT = END OF L.R.
           ADDD    2,S
           TFR     D,Y

STX     4,S                 ; IF Y - X < 4
           TFR     Y,D                 ;     THEN X=2,S/3,S & Y=0,S/1,S
           SUBD    4,S
           BLS     NOR4
           CMPD    #4
           BHS     NOR5
NOR4       LDX     2,S
           LDY     ,S

NOR5       LDB     #50
           LBSR    LINEAR_REGRESSION
           LBSR    SLOPE_IN_F2

LBSR    D_RINGTIME          ; 4,S/5,S = FIRST SAMPLE AFTER RINGDOWN
           STD     RINGTIME
           ADDD    #FS1
           STD     4,S
           LDX     #FS1                ; FILE 2 = FILE 1 FOR ALL SAMPLES FROM
           LDY     #FS2                ;                 4,S TO FILE END.
NOR7       LEAX    1,X                 ;
```

```
           LEAY    1,Y              ; Note; file 2 is now equal to the echo
           CMPX    ,S               ;       profile but with the ringdown
           BEQ     NOR9             ;       replaced by a linear regression.
           CMPX    4,S
           BNE     NOR7
NOR8       LDA     ,X+
           STA     ,Y+
           CMPX    ,S
           BNE     NOR8

NOR9       LEAS    6,S
           PULS    X,Y,D,CC
           RTS

D_CROSSOVER:       ; RETURN D = CELL # for CROSSOVER FROM SHORT TO LONG SHOT.
                   ;                 (ie far end blanking for short shot)
                   ; MAXIMUM = 50 % OF FILE_SIZE

LEAS    -2,S

LDA     EP98             ; IF EP98 = 1 THEN D = 0,S = 24  (1 meter)
           CMPA    #1               ; IF EP98 = 2 THEN D = 0,S = 48  (2 meter)
           BNE     DOVER1           ;              ELSE D = 0,S = 72 (3 meter)
           LDD     #24
           BRA     DOVER3
DOVER1     CMPA    #2
           BNE     DOVER2
           LDD     #48
           BRA     DOVER3
DOVER2     LDD     #72
DOVER3     STD     ,S

LDD     FILE_SIZE        ; D = 50 % OF FILE_SIZE
           LSRA
           RORB

CMPD    ,S               ; IF 0,S < D THEN D = 0,S
           BLS     DOVER4
           LDD     ,S

DOVER4     LEAS    2,S
           RTS

SMOOTH_FILE_2:     ; SMOOTH FILE 2, USE FILE 6 AS WORK SPACE,
                   ; AVERAGES 2**P SAMPLES, P=0-7 IN REG A
                   ; IF FILE_SIZE < 130 THEN FILE 2 AND 6 ARE EXTENDED TO 130.

PSHS    X,Y,D,CC
           LEAS    -12,S

TSTA                     ; IF P = 0 THEN QUIT
           LBEQ    SMTH9

CMPA    #7               ; IF P > 7 THEN P = 7
           BLS     SMTH1
           LDA     #7

SMTH1      STA     7,S              ; 7,S = P
```

```
          LDB     #4              ;  8,S =   2**(P-1)+1
          MUL                     ;  9,S =   2**P
          LEAY    <SMTH10,PCR     ; 10,S =  -2**P
          LEAY    B,Y             ; 11,S =   2**(P-1)-1
          LDD     ,Y
          STD     8,S
          LDD     2,Y
          STD     10,S

LDA     #$26            ; FILE 6 = FILE 2
          LBSR    COPY_FILE

LDA     #6              ; 5,S/6,S = FILE 6 END + 1 = Y
          LBSR    FILE_POINTERS   ;           X = FILE 6 START
          STY     5,S

LDD     #130            ; IF FILE_SIZE < 130
          SUBD    FILE_SIZE       ;     THEN EXTEND FILE 6 TO 130 BYTES
          BLS     SMTH3           ;     USING END SAMPLE
          LDA     -1,Y
SMTH2     STA     ,Y+
          DECB
          BNE     SMTH2
          STY     5,S

SMTH3     LDY     #FS2            ; FILL IN FIRST 2**(P-1)+1 SAMPLES OF F2
          LDB     1,Y             ; WITH SECOND SAMPLE IN FILE 2.
          LDA     8,S
SMTH4     STB     ,Y+
          DECA
          BNE     SMTH4

CLR     ,S              ; 0,S/1,S = SUM OF FIRST 2**P SAMPLES OF F6
          CLR     1,S
          LDA     9,S
          STA     2,S
SMTH5     LDB     ,X+
          CLRA
          ADDD    ,S
          STD     ,S
          DEC     2,S
          BNE     SMTH5

SMTH6     LDA     10,S            ; SUBTRACT FIRST SAMPLE OF SUM,
          LDB     A,X             ; AND ADD NEXT SAMPLE.
          CLRA
          STD     2,S
          LDB     ,X+
          CLRA
          ADDD    ,S
          SUBD    2,S
          STD     ,S              ; NEW SUM

LDA     7,S             ; DIVIDE SUM BY 2**P
          STA     2,S
          LDD     ,S
SMTH7     LSRA
          RORB
          DEC     2,S
```

```
            BNE     SMTH7

STB     ,Y+             ; AND STORE IN FILE 2

CMPX    5,S             ; IF NOT AT 'FILE 6 END + 1' THEN LOOP
            BNE     SMTH6

LDA     11,S            ; FILL IN LAST 2**(P-1)-1 SAMPLES OF F2
    SMTH8   STB     ,Y+
            DECA
            BNE     SMTH8

SMTH9   LEAS    12,S
            PULS    X,Y,D,CC
            RTS

SMTH10  DB      0,   0,   0,   0    ; P=0,    NO SMOOTHING
            DB      2,   2,  -2,   0    ; P=1,    2 PNT SMOOTHING
            DB      3,   4,  -4,   1    ; P=2,    4
            DB      5,   8,  -8,   3    ; P=3,    8
            DB      9,  16, -16,   7    ; P=4,    16
            DB     17,  32, -32,  15    ; P=5,    32
            DB     33,  64, -64,  31    ; P=6,    64
            DB     65, 128,-128,  63    ; P=7,    128

FLATTEN_FILE_2:  ; REMOVE ALL RISING BUMPS FROM FILE 2

PSHS    X,Y,D,CC
            LEAS    -2,S

LDA     #2              ;       X = FILE 2 START
            LBSR    FILE_POINTERS   ; 0,S/1,S = FILE 2 END +1
            STY     ,S

FLAT1   LDA     ,X+             ; REPEAT UNTIL X = 0,S/1,S
            CMPX    ,S              ;
            BEQ     FLAT2           ;       IF SAMPLE < SAMPLE + 1
            CMPA    ,X              ;       THEN SAMPLE + 1 = SAMPLE
            BHS     FLAT1
            STA     ,X
            BRA     FLAT1

FLAT2   LEAS    2,S
            PULS    X,Y,D,CC
            RTS

D_BREAKPOINT:   ; INPUT;  FILE 1 = ECHO PROFILE
                    ;
                    ; OUTPUT; D = INDEX TO BREAKPOINT (start of flat profile)
                    ;                Note: minimum D = D_CROSSOVER

PSHS    X,Y,CC
            LEAS    -2,S

LDA     #1              ; 0,S/1,S = FILE 1 START
            LBSR    FILE_POINTERS   ;        Y = FILE 1 END + 1
            STX     ,S
```

```
        LBSR    A_END           ; A = AVERAGE OF LAST FOUR SAMPLES + 5 dB
        ADDA    #5

BP1     CMPA    ,-Y             ; DECREMENT Y UNTIL ,Y > A
        BLO     BP2             ;             OR Y = 0,S/1,S
        CMPY    ,S
        BHI     BP1

BP2     TFR     Y,D             ; D = Y - 0,S/1,S
        SUBD    ,S              ;     OR
        STD     ,S              ;     D_CROSSOVER
        LBSR    D_CROSSOVER     ;       which ever is greater
        CMPD    ,S
        BHS     BP3
        LDD     ,S

BP3     LEAS    2,S
        PULS    X,Y,CC
        RTS

PNT_X           EQU     1*4
PNT_Y           EQU     2*4
RATE_X          EQU     3*4     ; INTERGER SPACING BETWEEN X SAMPLES
NUMB            EQU     4*4     ; ACTUAL NUMBER OF SAMPLES USED FOR L.R.
SUM_X           EQU     5*4
SUM_Y           EQU     6*4
SUM_XY          EQU     7*4
SUM_XX          EQU     8*4
SLOPE           EQU     9*4
INTERSECT       EQU     10*4
REGX            EQU     11*4

REG20           DW      $0000,$0000     ; 0
REG21           DW      $8C80,$0000     ; 2048

LINEAR_REGRESSION:
        ; INPUTS  X = START,  Y = END + 1 (pointers in file 2)
        ;         B = NUMBER OF POINTS TO USE FOR L.R.
        ;             (space from X to Y is divided into B pieces)
        ;
        ; IF Y-X > 1  THEN RETURNS Y = INTERSECT, X = -SLOPE * 2048
        ;             ELSE RETURNS Y = 0,X  &  X = 0
        ;
        ; TIME USED DEPENDS ON NUMBER OF POINTS
        ;             100 POINTS ... 1700 mS
        ;              50 POINTS ... 1000 mS
        ;              20 POINTS ...  500 mS
        ;              10 POINTS ...  350 mS

PSHS    D,U,CC
        LEAS    -16,S
        TFR     S,U
        LEAS    -48,S

STY     ,S              ; 0,S/1,S = END + 1
        STX     2,S             ; 2,S/3,S = START

CMPB    #2              ;    NUMB = B  (minimum = 2)
        BHS     REG1
```

```
                LDB     #2
    REG1    CLRA
                STD     NUMB,S

CLRA                            ; Y = 0,X  &   X = 0
                LDB     ,X
                TFR     D,Y
                LDX     #0

LDD     ,S                      ; D = 0,S/1,S - 2,S/3,S = NUMBER OF SAMPLES
                SUBD    2,S                     ; IF D <= 1 THEN QUIT
                LBLS    REG9
                CMPD    #1
                LBLS    REG9
                CLR     REGX+0,S                ; RATE_X = D / 100   (minmimum = 1)
                CLR     REGX+1,S
                STD     REGX+2,S
                LEAY    REGX,S
                LEAX    NUMB,S
                LBSR    BINARY_DIVIDE
                LDD     REGX+2,S
                CMPD    #1
                BHS     REG2
                LDD     #1
    REG2    STD     RATE_X,S LEAX    REG20,PCR               ; SUM_X = SUM_Y = SUM_XY = SUM_XX = 0
                JSR     [CALC]
                DB      17,0
                LEAX    SUM_X,S
                JSR     [CALC]
                DB      16,0
                LEAX    SUM_Y,S
                JSR     [CALC]
                DB      16,0
                LEAX    SUM_XY,S
                JSR     [CALC]
                DB      16,0
                LEAX    SUM_XX,S
                JSR     [CALC]
                DB      16,0

LDD     #0                      ; NUMB = 0
                STD     NUMB,S

REG3    LDD     NUMB,S                  ; NUMB = NUMB + 1
                ADDD    #1
                STD     NUMB,S

LDD     2,S                     ; PNT_X = SAMPLE #   (first sample is # 0)
                SUBD    #FS2
                STD     PNT_X,S LDX     2,S                     ; PNT_Y = SAMPLE VALUE
                CLRA
                LDB     ,X
                STD     PNT_Y,S

LEAX    PNT_X,S                 ; SUM_X = SUM_X + PNT_X
```

```
        JSR     [CALC]
        DB      13,0
        LEAX    SUM_X,S
        JSR     [CALC]
        DB      17,1,16,0

LEAX    PNT_Y,S         ; SUM_Y = SUM_Y + PNT_Y
        JSR     [CALC]
        DB      13,0
        LEAX    SUM_Y,S
        JSR     [CALC]
        DB      17,1,16,0

LEAX    PNT_X,S         ; SUM_XX = SUM_XX + PNT_X ** 2
        JSR     [CALC]
        DB      13,13,3,0
        LEAX    SUM_XX,S
        JSR     [CALC]
        DB      17,1,16,0

LEAX    PNT_X,S         ; SUM_XY = SUM_XY + PNT_X * PNT_Y
        JSR     [CALC]
        DB      13,0
        LEAX    PNT_Y,S
        JSR     [CALC]
        DB      13,3,0
        LEAX    SUM_XY,S
        JSR     [CALC]
        DB      17,1,16,0

LDD     2,S             ; 2,S/3,S = 2,S/3,S + RATE_X
        ADDD    RATE_X,S        ;       IF 2,S/3,S < 0,S/1,S
        STD     2,S             ;              THEN LOOP TO REG3
        CMPD    ,S
        BLO     REG3

LEAX    SUM_XY,S        ;       NUMB * SUM_XY - SUM_X * SUM_Y
        JSR     [CALC]          ; SLOPE = -------------------------------
        DB      17,0            ;  (fp)  NUMB * SUM_XX - SUM_X * SUM_X
        LEAX    NUMB,S
        JSR     [CALC]
        DB      13,3,0
        LEAX    SUM_X,S
        JSR     [CALC]
        DB      17,0
        LEAX    SUM_Y,S
        JSR     [CALC]
        DB      17,3,2,0
        LEAX    SUM_XX,S
        JSR     [CALC]
        DB      17,0
        LEAX    NUMB,S
        JSR     [CALC]
        DB      13,3,0
        LEAX    SUM_X,S
        JSR     [CALC]
        DB      17,17,3,2,4,0
        LEAX    SLOPE,S
        JSR     [CALC]
        DB      16,0
```

```
            LEAX    SUM_Y,S         ;           SUM_Y - SLOPE * SUM_X
            JSR     [CALC]          ; INTERSECT = ---------------------
            DB      17,0            ;   (binary)          NUMB
            LEAX    SLOPE,S
            JSR     [CALC]
            DB      17,0
            LEAX    SUM_X,S
            JSR     [CALC]
            DB      17,3,2,0
            LEAX    NUMB,S
            JSR     [CALC]
            DB      13,4,0
            LEAX    INTERSECT,S
            JSR     [CALC]
            DB      12,0

LEAX    REG21,PCR       ; SLOPE = - SLOPE * 2048
            JSR     [CALC]          ;   (fp)       (bin)
            DB      17,0
            LEAX    SLOPE,S
            JSR     [CALC]
            DB      17,8,3,12,0

LDX     SLOPE,S
            LDY     INTERSECT,S

REG9        LEAS    48,S
            LEAS    16,S
            PULS    D,U,CC
            RTS

SLOPE_IN_F2:        ; DRAW SLOPE IN FILE 2
                    ; INPUTS;  X = -SLOPE * 2048,  Y = INTERSECT
                    ;       RANGE OF SLOPE = 0.0005 TO 27 BITS/SAMPLE
                    ;                      = 0.01 TO 650 dB/METER

PSHS    X,Y,D,CC
            LEAS    -12,S

STY     4,S             ; 4,S/5,S = INTERSECT
            STX     6,S             ; 6,S/7,S = -SLOPE * 2048

LDA     #2              ; 0,S/1,S = FILE 2 END + 1
            LBSR    FILE_POINTERS   ; 2,S/3,S = FILE 2 START
            STY     ,S
            STX     2,S

SLOP1       LDD     2,S             ; 8,S/9,S = SAMPLE #   (first sample is # 0)
            SUBD    #FS2
            STD     8,S LEAY    8,S             ; 8,S/9,S/10,S/11,S
            LEAX    6,S             ;       = 8,S/9,S * (-SLOPE * 2048)
            LBSR    BINARY_MULTIPLY LSR     8,S             ; 9,S/10,S = 8,S/9,S/10,S/11,S  / 2048
            ROR     9,S             ;          = SAMPLE # * SLOPE
            ROR     10,S
            LSR     8,S
```

```
            ROR     9,S
            ROR     10,S
            LSR     8,S
            ROR     9,S
            ROR     10,S

LDD     4,S             ; B = INTERSECT - 9,S/10,S
            SUBD    9,S             ;           0 < B < 255
            BCC     SLOP2
            LDD     #0
SLOP2       TSTA
            BEQ     SLOP3
            LDB     #255

SLOP3       LDX     2,S
            STB     ,X+
            STX     2,S
            CMPX    ,S
            BNE     SLOP1

LEAS    12,S
            PULS    X,Y,D,CC
            RTS

D_RINGTIME:         ; RETURN D = INDEX TO FIRST SAMPLE AFTER RINGDOWN
                    ;            BLANKING <= D <= INTERSECT OF F1 & F2
                    ; INPUT;  FILE 1 = ECHO PROFILE
                    ;         FILE 2 = LINEAR REGRESSION

PSHS    X,Y,CC
            LEAS    -4,S

LDA     #1              ; 0,S/1,S = FILE 1 END + 1
            LBSR    FILE_POINTERS   ;       X = FILE 1 START
            STY     ,S

LBSR    FIRST_VALLEY_X  ; 2,S/3,S = FIRST VALLEY IN FILE 1,
            STX     2,S             ;           AFTER BLANKING, WITH P-V > EP75
                                    ;           AND PEAK > SHORT_FLOOR

LDX     #FS1            ; IF
            LDY     #FS2            ;       2,S/3,S > FIRST INTERSECT OF F1 & F2
DRING2      LDA     ,X+
            CMPA    ,Y+
            BHI     DRING2          ; THEN
            TFR     X,D             ;       2,S/3,S = FIRST INTERSECT OF F1 & F2
            CMPD    2,S
            BHS     DRING3
            STD     2,S

DRING3      LDD     2,S
            SUBD    #FS1

LEAS    4,S
            PULS    X,Y,CC
            RTS

TVT_LINEAR:                 ; INPUT  FILE 2 = DATA
                            ; OUTPUT FILE 2 = SLOPE + HORIZONTAL
```

```
                LEAS    -4,S

LDA     #2              ; 0,S/1,S = FILE 2 END + 1
                LBSR    FILE_POINTERS   ; 2,S/3,S = FILE 2 START
                STY     ,S              ;     X = FILE 2 START
                STX     2,S             ;     Y = X + D_BREAKPOINT
                LBSR    D_BREAKPOINT
                ADDD    2,S
                TFR     D,Y

LDB     #100
                LBSR    LINEAR_REGRESSION
                LBSR    SLOPE_IN_F2

LBSR    A_END           ; DRAW HORIZONTAL LINE FROM END OF FILE 2
                LDY     ,S              ;     UNTIL INTERSECTION WITH SLOPE
TVTL1           STA     ,-Y             ;     (or until start of file 2)
                CMPA    -1,Y
                BLS     TVTL2
                CMPY    2,S
                BNE     TVTL1

TVTL2           LEAS    4,S
                RTS

RINGDOWN_F2:    ; PUT DAC_MAX IN FILE 2 FROM START TO RINGTIME

PSHS    X,Y,D,CC
                LEAS    -4,S

LDA     #2              ; 0,S/1,S = FIRST SAMPLE AFTER RINGDOWN
                LBSR    FILE_POINTERS   ; 2,S/3,S = END OF FILE
                STX     ,S              ;     X = START OF FILE
                STY     2,S
                LDD     RINGTIME
                ADDD    ,S
                STD     ,S

RD1             LDA     #DAC_MAX        ; ,X+ = DAC_MAX
                STA     ,X+             ;     UNTIL X =0,S/1,S or 2,S/3,S
                CMPX    ,S
                BEQ     RD2
                CMPX    2,S
                BNE     RD1

RD2             LEAS    4,S
                PULS    X,Y,D,CC
                RTS

ALF_ALGORITHM:          ; INPUT;  F1 = ECHO PROFILE
                        ;         F2 = TVT CURVE
                        ; OUTPUT; X = ECHO POSITION IN # OF SAMPLES
                        ;         Y = ECHO PEAK POINTER IN FILE 1
                        ;         A = ECHO CONFIDENCE.
                        ;         B = SILL

PSHS    U,CC

LDD     #$0300          ; F3 = 0
```

```
        LBSR    PUT_B_IN_FILE_A

CLRB                    ; B = 0 = NUMBER OF ALGORITHMS USED

LDA     EP78            ; IF BIT 2 OF EP78 = 1 THEN DO AREA & INC B
        BITA    #%00000100
        BEQ     LA1
        LBSR    ADD_ALL_AREA_ECHOES_TO_FILE_3
        INCB

LA1     BITA    #%00000010      ; IF BIT 1 OF EP78 = 1 THEN DO LARGE & INC B
        BEQ     LA2
        LBSR    ADD_ALL_LARGE_ECHOES_TO_FILE_3
        INCB

LA2     BITA    #%00000001      ; IF BIT 0 TO EP78 = 1 THEN DO FIRST & INC B
        BEQ     LA3
        LBSR    ADD_ALL_FIRST_ECHOES_TO_FILE_3
        INCB

LA3     LDA     #3              ; DIVIDE FILE 3 BY B (the # of algorithms)
        LBSR    DIV_FILE_A_BY_B ;

LBSR    SELECT_BEST_ECHO_FROM_FILE_3

PULS    U,CC
        RTS

ADD_ALL_AREA_ECHOES_TO_FILE_3:

; INPUT;  FILE 1 = ECHO PROFILE
                ;         FILE 2 = TVT CURVE
                ; OUTPUT; ECHO AREA / 8  IS ADDED TO F3 AT POSITION OF PEAK.
                ;         ECHO AREA IS THE TOTAL AREA OF EACH ECHO ABOVE TVT.
                ;         PEAK IS CELL WITH LARGEST F1 - F2 WITHIN REGION
                ;         OF AREA CALCULATION.  IF MORE THAN ONE LARGEST CELL
                ;         THEN THE LAST ONE IS USED.

PSHS    X,Y,U,D,CC
        LEAS    -7,S

LDA     #1              ; X = FILE 1 START
        LBSR    FILE_POINTERS   ; Y = FILE 2 START
        STY     ,S              ; 0,S/1,S = FILE 1 END + 1
        LDY     #FS2

LBSR    ADD_BLANK_TO_X  ;
        LBSR    ADD_BLANK_TO_Y

AAE2    LEAX    1,X             ; X & Y = RISE INTERSECT
        LEAY    1,Y             ; or QUIT IF NO INTERSECT
        CMPX    ,S
        BEQ     AAE9
        LDB     ,X
        CMPB    ,Y
        BLS     AAE2

CLR     2,S             ; 2,S/3,S = SUM OF AREA UP TO
        CLR     3,S             ;           FALL INTERSECT OR EOF
```

```
        STX     4,S             ; 4,S/5,S = PEAK POINTER
        CLR     6,S             ;   X & Y = FALL INTERSECT OR EOF
AAE3    LDB     ,X
        SUBB    ,Y
        BLS     AAE5
        CMPB    6,S
        BLO     AAE4
        STB     6,S
        STX     4,S
AAE4    CLRA
        ADDD    2,S
        STD     2,S
        LEAX    1,X
        LEAY    1,Y
        CMPX    ,S
        BNE     AAE3

AAE5    LDD     4,S             ; U = 4,S - FS1 + FS3 = PEAK POINTER IN F3
        SUBD    #FS1
        ADDD    #FS3
        TFR     D,U
        LDD     2,S             ; ,U = ,U + AREA SUM / 8
        LSRA
        RORB
        LSRA
        RORB
        LSRA
        RORB
        ADDB    ,U
        STB     ,U

CMPX    ,S
        BNE     AAE2

AAE9    LEAS    7,S
        PULS    X,Y,U,D,CC
        RTS

ADD_ALL_LARGE_ECHOES_TO_FILE_3:

; INPUT   FILE 1 = ECHO PROFILE
                ;         FILE 2 = TVT CURVE
                ; OUTPUT  ECHO HEIGHT IS ADDED TO F3 AT POSITION OF PEAK
                ;         ECHO HEIGHT IS F1 - F2.
                ;         PEAK IS CELL WITH LARGEST F1 - F2 WITHIN REGION
                ;         OF ECHO ABOVE TVT.  IF MORE THAN ONE LARGEST CELL
                ;         THEN THE LAST ONE IS USED.

PSHS    X,Y,U,D,CC
        LEAS    -5,S

LDA     #1              ; X = FILE 1 START
        LBSR    FILE_POINTERS   ; Y = FILE 2 START
        STY     ,S              ; 0,S/1,S = FILE 1 END + 1
        LDY     #FS2

LBSR    ADD_BLANK_TO_X
        LBSR    ADD_BLANK_TO_Y
```

```
ALE2    LEAX    1,X             ; X & Y = RISE INTERSECT
        LEAY    1,Y             ; or QUIT IF NO INTERSECT
        CMPX    ,S
        BEQ     ALE9
        LDB     ,X
        CMPB    ,Y
        BLS     ALE2

STX     2,S             ; 2,S/3,S = PEAK POINTER
        CLR     4,S             ;    4,S = PEAK - TVT
ALE3    LDB     ,X              ; X & Y = FALL INTERSECT OR EOF
        SUBB    ,Y
        BLS     ALE5
        CMPB    4,S
        BLO     ALE4
        STB     4,S
        STX     2,S
ALE4    LEAX    1,X
        LEAY    1,Y
        CMPX    ,S
        BNE     ALE3

ALE5    LDD     2,S             ; U = 2,S - FS1 + FS3 = PEAK POINTER IN F3
        SUBD    #FS1
        ADDD    #FS3
        TFR     D,U

LDB     4,S             ; ,U = ,U + (PEAK - TVT)
        ADDB    ,U
        STB     ,U

CMPX    ,S
        BNE     ALE2

ALE9    LEAS    5,S
        PULS    X,Y,U,D,CC
        RTS

ADD_ALL_FIRST_ECHOES_TO_FILE_3:

; INPUT;  FILE 1 = ECHO PROFILE
                ;         FILE 2 = TVT CURVE
                ; OUTPUT; HEIGHT OF FIRST ECHO IS ADDED TO F3 AT POSITION
                ;         OF PEAK.  ECHO HEIGHT IS F1 - F2.
                ;         PEAK IS CELL WITH LARGEST F1 - F2 WITHIN REGION
                ;         OF ECHO ABOVE TVT.  IF MORE THAN ONE LARGEST CELL
                ;         THEN THE LAST ONE IS USED.
                ;         TVT IS RAISED TO CLEAR THE FIRST ECHO THEN REPEAT
                ;         WITH NEW FIRST ECHO ADDED TO F3 UNTIL NO
                ;         INTERSECTION OF F1 AND F2.
                ; USES FILE 4

PSHS    X,Y,D,CC
        LEAS    -1,S

LDA     #$24            ; F4 = F2    (save TVT)
        LBSR    COPY_FILE
```

```
AFE1    LBSR    FIRST_INTERSECT ;  0,S = PEAK - TVT = CONFIDENCE
        STA     ,S              ;   X = ECHO PEAK POINTER IN FILE 1

CMPX    #0              ; IF X = 0 THEN QUIT (no intersect)
        BEQ     AFE9

TFR     X,D             ; Y = X - FS1 + FS3
        SUBD    #FS1            ;   = PEAK POINTER IN FILE 3
        ADDD    #FS3
        TFR     D,Y

LDA     ,S              ; ,Y = ,Y + 0,S
        ADDA    ,Y
        BCC     AFE2
        LDA     #255
AFE2    STA     ,Y

LDB     ,S              ; F2 = F2 + 0,S  (move TVT up to peak)
        CMPB    #1              ; or F2 = F2 + 1 if 0,S = 0
        BHS     AFE3
        LDB     #1
AFE3    LDA     #2
        LBSR    ADD_B_TO_FILE_A

BRA     AFE1            ; LOOP FOR NEXT ECHO

AFE9    LDA     #$42            ; F2 = F4  (restore TVT)
        LBSR    COPY_FILE

LEAS    1,S
        PULS    X,Y,D,CC
        RTS

FIRST_INTERSECT:                ; SELECT FIRST ECHO, AFTER BLANKING, ABOVE TVT.
                                ;
                                ; INPUT;   F1 = PROFILE
                                ;          F2 = TVT
                                ; OUTPUT;  X = F1 PEAK POINTER = 0 IF NONE
                                ;          A = PEAK - TVT

PSHS    Y,B,CC
        LEAS    -5,S

LDA     #1              ; 0,S/1,S = FILE 1 END + 1
        LBSR    FILE_POINTERS   ; X = FILE 1 START
        STY     ,S              ; Y = FILE 2 START
        LDY     #FS2

LBSR    ADD_BLANK_TO_X  ; X = FILE 1 FIRST   SAMPLE
        LBSR    ADD_BLANK_TO_Y  ; Y = FILE 2           "

FINT1   LDA     ,X              ; INC X & Y UNTIL ,X > ,Y (intersect)
        SUBA    ,Y              ;     A = ,X - ,Y
        BHI     FINT2
        LEAX    1,X
        LEAY    1,Y
        CMPX    ,S
        BNE     FINT1
        LDX     #0
```

```
              BRA      FINT9
FINT2   STX      2,S            ; INC X & Y UNTIL ,X < ,Y (intersect)
        STA      4,S            ;
FINT3   LDA      ,X             ;      2,S/3,S = F1 POINTER TO PEAK
        SUBA     ,Y             ;          4,S = PEAK - TVT
        BLO      FINT5
        CMPA     4,S
        BLO      FINT4
        STX      2,S
        STA      4,S
FINT4   LEAX     1,X
        LEAY     1,Y
        CMPX     ,S
        BNE      FINT3

FINT5   LDX      2,S            ; X = 2,S/3,S = PEAK POINTER
        LDA      4,S            ; A = 4,S = PEAK - TVT

FINT9   LEAS     5,S
        PULS     Y,B,CC
        RTS

SELECT_BEST_ECHO_FROM_FILE_3:    ; INPUT  FILE 1 = ECHO PROFILE
                                 ;        FILE 3 = SUMED ECHO CONFIDENCES
                                 ;                 STORED AT ECHO PEAKS
                                 ; OUTPUT  X = ECHO POSITION IN # OF SAMPLES
                                 ;         Y = ECHO PEAK POINTER IN FILE 1
                                 ;         A = SUM OF ECHO CONFIDENCES.
                                 ;         B = SILL

PSHS     CC
        LEAS     -3,S

LBSR     HIGHEST_IN_FILE_3   ; 1,S = X = PEAK POINTER IN FILE 3
        STX      1,S                 ; 0,S = BEST CONFIDENCE
        STA      ,S

LBSR     REMOVE_NEARBY_ECHOES_FROM_FILE_3

CLR      ,X                  ; 0,S = CONF = BEST - NEXT BEST
        LBSR     HIGHEST_IN_FILE_3
        LDB      ,S
        STA      ,S
        SUBB     ,S
        STB      ,S

LDD      1,S            ; Y = 1,S - #FS3 + #FS1
        SUBD     #FS3           ;   = PEAK POINTER IN FILE 1
        ADDD     #FS1
        TFR      D,Y

LBSR     ECHO_POSITION  ; Y = UNCHANGED ( PEAK POINTER IN FILE 1)
                                ; X = ECHO POSITION IN # OF SAMPLES
                                ; B = SILL

LDA      ,S             ; A = 0,S = CONF
```

```
           LEAS    3,S
           PULS    CC
           RTS

HIGHEST_IN_FILE_3:                   ; INPUT    FILE 3
                                     ; OUTPUT   X = POINTER TO HIGHEST
                                     ;          A = HIGHEST
                                     ; IF FILE 3 = 0 OR CONSTANT
                                     ;    THEN X = FILE 3 START
                                     ;     AND A = 0

PSHS    Y,B,CC
           LEAS    -5,S

LDA     #3                ; X = FILE 3 START
           LBSR    FILE_POINTERS     ; 0,S/1,S = FILE 3 END + 1
           STY     ,S

STX     2,S               ; 2,S/3,S = POINTER TO HIGHEST
           CLR     4,S               ;     4,S = HIGHEST
HIF1       LDA     ,X
           CMPA    4,S
           BLS     HIF2
           STA     4,S
           STX     2,S
HIF2       LEAX    1,X
           CMPX    ,S
           BNE     HIF1

LDX     2,S               ; X = 2,S/3,S
           LDA     4,S               ; A = 4,S

LEAS    5,S
           PULS    Y,B,CC
           RTS

REMOVE_NEARBY_ECHOES_FROM_FILE_3:    ; X POINTS TO FILE 3

PSHS    X,Y,D,CC
           LEAS    -8,S

STX     6,S               ; 6,S/7,S = POINTER TO HIGHEST

LDA     #3                ; 0,S/1,S = FILE 3 END + 1
           LBSR    FILE_POINTERS     ; 2,S/3,S = FILE 3 START
           STX     2,S
           STY     ,S

LDD     FILE_SIZE         ; 4,S = 12.5 % OF FILE SIZE
           LSRA
           RORB
           LSRA
           RORB
           LSRA
           RORB
           STD     4,S

LDX     6,S               ; CLEAR 12.5 % OF FILE BEFORE 6,S/7,S
           LDD     4,S               ;       QUIT LOOP IF FILE START
```

```
RNE3    CMPX    2,S
        BEQ     RNE4
        CLR     ,-X
        SUBD    #1
        BNE     RNE3

RNE4    LDX     6,S              ; CLEAR 12.5 % OF FILE AFTER 6,S/7,S
        LDD     4,S              ;         QUIT LOOP IF EOF
RNE5    CMPX    ,S
        BEQ     RNE6
        LEAX    1,X
        CLR     ,X
        SUBD    #1
        BNE     RNE5

RNE6    LEAS    8,S
        PULS    X,Y,D,CC
        RTS

ECHO_POSITION:                   ; INPUT  FILE 1 = ECHO PROFILE
                                 ;        FILE 2 = TVT CURVE
                                 ;        Y = PEAK POINTER IN FILE 1
                                 ; OUTPUT B = SILL IN BITS
                                 ;        X = ECHO POSITON IN # OF SAMPLES
                                 ; Echo positon is obtained as follows;
                                 ;  1. locate intersect before peak
                                 ;  2. locate valley before intersect
                                 ;  3. set sill = (peak + valley) / 2
                                 ;  4. echo position is firsst intersect
                                 ;     of sill and echo after valley.

PSHS    Y,A,CC
        LEAS    -3,S

TFR     Y,X
        STX     ,S               ; ,S = X = PEAK POINTER

LDA     ,X               ; 2,S = ,X = PEAK VALUE
        STA     2,S

TFR     X,D              ; Y = X - FS1 + FS2 = PEAK POINTER IN FILE 2
        SUBD    #FS1
        ADDD    #FS2
        TFR     D,Y

EPOS1   CMPX    #FS1             ; DEC X & Y UNTILL ,X <= ,Y
        BEQ     EPOS2            ;   HENCE X = INTERSECT POINTER IN FILE 1
        LDA     ,-X
        CMPA    ,-Y
        BHI     EPOS1

EPOS2   LDB     #6               ; X = VALLEY POINTER
        LBSR    REVERSE_VALLEY   ; A = VALLEY VALUE

ADDA    2,S              ; A = 2,S = (2,S + A) / 2 = SILL
        RORA
        STA     2,S

EPOS3   CMPX    ,S               ; INC X UNTILL  ,X >= A
```

```
              BEQ     EPOS4         ; HENCE X = INTERSECT OF SILL AND ECHO
              LEAX    1,X
              CMPA    ,X
              BHI     EPOS3

EPOS4         TFR     X,D           ; X = X - FS1 = ECHO POSITION IN # OF SAMPLES
              SUBD    #FS1
              TFR     D,X

LDB     2,S           ; B = 2,S = SILL

LEAS    3,S
              PULS    Y,A,CC
              RTS

REVERSE_VALLEY: ; GET VALLEY BY REVERSE SEARCH
              ; INPUT X = PNTER TO START SEARCH IN F1
              ;       B = RIPPLE REJ IN DB
              ; OUTPUTS A = VALLEY VALUE <= 0,X
              ;         X = VALLEY PNTER <= INPUT

PSHS    Y,B,CC
              LEAS    -4,S
              STB     3,S
              LDA     ,X
              STA     ,S            ; VALLEY
              STX     1,S           ; VALLEY PNTER

VALR2         LEAX    1,X
VALR3         LEAX    -1,X          ; LOCAL VALLEY
              LDA     ,X
              CMPX    #FS1
              BEQ     VALR4
              CMPA    -1,X
              BHS     VALR3

VALR4         CMPA    ,S
              BHI     VALR7         ; STOP IF NEW VALLEY > OLD
              STA     ,S
              STX     1,S

LDB     ,X
              ADDB    3,S           ; PEAK REJ LIMIT
              BCC     VALR5
              LDB     #$FF
VALR5         LEAX    1,X
VALR6         LEAX    -1,X          ; LOCAL PEAK
              CMPX    #FS1
              BEQ     VALR7
              CMPB    ,X
              BLS     VALR7         ; PEAK TOO BIG
              LDA     ,X
              CMPA    -1,X
              BLS     VALR6
              BRA     VALR2

VALR7         LDA     ,S
              LDX     1,S
              LEAS    4,S
              PULS    Y,B,CC
              RTS
```

I claim:

1. In an acoustic ranging system comprising at least one electro-acoustic transducer directed towards the surface of material whose level is to be determined, a transmitter to transmit pulses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the computing means is programmed to examine the digital data base file depicting the profile of the received signal to measure the height and width of peaks in the profile, and to modify the profile by removing peaks whose height to width ratio exceeds a predetermined threshold beyond which the ratio is deemed too great for the peak to represent a true echo.

2. An acoustic ranging system according to claim 1, wherein the computing means is further programmed to examine the digital data base file depicting the profile of the received signal to measure the width of valleys in the profile, and to remove valleys whose width is less than a predetermined threshold such that peaks which the valleys separate could represent fragmented echoes from a common target.

3. An acoustic ranging system according to claim 2, wherein the computing means is further programmed to perform a linear regression upon at least a portion of the data base file to generate a file containing a linear time varying threshold, and to compare the data base file depicting the signal profile with the linear time varying threshold file to identify peaks in the signal profile.

4. An acoustic ranging system according to claim 2, wherein the computing means is further programmed to generate a file containing a time varying threshold, and to compare this file repeatedly with the data base file depicting the signal profile both to identify peaks in the latter and the magnitude of such peaks, utilizing successively different criteria, to generate a file containing the summed magnitudes of the peaks located by said repeated comparisons at different locations on the profile, and to select the largest of said summed magnitudes as identifying a peak in the echo profile representing a true echo.

5. An acoustic ranging system according to claim 2, wherein the computing means is programmed to introduce a selected local upward adjustment into a time varying threshold file generated for comparison with the digital data base file depicting the profile of the received signal, the adjustment being selected as to location and magnitude such as to prevent detection of a spurious echo of known location and magnitude when the files are compared.

6. An acoustic ranging system according to claim 3, wherein the computing means is programmed to introduce a local upward adjustment into a time varying threshold file generated for comparison with the digital data base file depicting the profile of the received signal, the adjustment being selected as to location and magnitude such as to prevent detection of a spurious echo of known location and magnitude when the files are compared.

7. An acoustic ranging system according to claim 4, wherein the computing device is programmed to carry out plural comparisons between the data base file of the received signal profile and the time varying threshold file, said comparisons being selected from a comparison measuring the magnitudes of peaks in the received signal profile as a proportion of their area above the time varying threshold, a comparison measuring the magnitude of peaks as their height above the time varying threshold, and a comparison measuring the magnitude of peaks above the time varying threshold as their height above that threshold, the threshold being raised each time a peak is detected so as to intersect that peak.

8. In an acoustic ranging system comprising at least one electro-acoustic transducer directed towards the surface of material whose level is to be determined, a transmitter to transmit pluses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

wherein the computing means is programmed to examine the digital data base file depicting the profile of the received signal to measure the width of valleys in the profile, and to remove valleys whose width is less than a predetermined threshold such that peaks which the valleys separate could represent fragmented echoes from a common target.

9. In an acoustic ranging system comprising at least one electro-acoustic transducer directed towards the surface of material whose level is to be determined, a transmitter to transmit pluses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the computing means is programmed to perform a linear regression upon at least a portion of the data base file to generate a file containing a linear time varying threshold, and to compare the data base file depicting the signal profile with the linear time varying threshold file to identify peaks in the signal profile.

10. An acoustic ranging system as claimed in claim 9, wherein the computing means is programmed to perform the steps of removing a first portion of the data base file corresponding to a ringdown period of the transducer, removing a latter part of the file following a breakpoint at which the mean amplitude of the signal sanples has become substantially constant, performing a linear regression upon the remaining portion to obtain a slope, and inserting an extrapolation of this slope to replace the removed first portion of the file.

11. An acoustic ranging system as claimed in claim 10, wherein the computing means is programmed to perform a further linear regression upon the data base file as modified by replacement of its first portion, to construct a first portion of the time varying threshold file from the slope thus obtained, and to construct a remaining portion from a horizontal line intersecting the slope at the breakpoint.

12. An acoustic ranging system as claimed in claim 9, wherein the computing means is programmed to introduce a predetermined local upward adjustment into a time varying threshold file generated for comparison with the digital data base file depicting the profile of the received signal, the adjustment being predetermined as to location and magnitude such as to prevent detection of a spurious echo of known location and magnitude when the files are compared.

13. In an acoustic ranging system comprising at least one electro-acoustic transducer directed towards the surface of material whose level is to be determined, a transmitter to transmit pluses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the computing means is programmed to generate a file containing a time varying threshold, and to compare this file repeatedly with the data base file depicting the signal profile, both to identify peaks in the latter and the magnitude of such peaks, utilizing successively different criteria, to generate a file containing the summed magnitudes of the peaks located by said comparisons at different locations on the profile, and to select the largest of said summed magnitudes as identifying a peak in the echo profile representing a true echo.

14. An acoustic ranging system according to claim 13, wherein the different criteria for assessing the magnitudes of the peaks are the areas of the peaks, the height of the peaks, and the height by which each successive peak exceeds that of a preceding peak.

15. An acoustic ranging system according to claim 13, wherein the computing means is programmed to compare the largest of said summed magnitudes with the next largest of said summed magnitudes which corresponds to a peak more than a predetermined distance from the peak corresponding to the largest of said summed magnitudes.

16. In an acoustic ranging system comprising at least one electro-acoustic transducer directed towards the surface of material whose level is to be determined, a transmitter to transmit pluses of electrical energy to energize selectively each said transducer whereby to cause it to emit at least one shot of acoustic energy at a predetermined frequency, a receiver receiving and amplifying electrical energy from said at least one shot regenerated by said transducer from acoustic energy at the same frequency received by the transducer over a subsequent period, the time lapse after a shot before receipt by said receiver of energy regenerated from an echo from said surface being proportional to the distance of the origin of the echo, signal processing means comprising analog to digital converter means to sample repeatedly the output amplitude of the signal from the receiver at defined intervals and to digitize the samples; memory means to store an extended sequence of digitized samples so produced in respect of at least one shot and form therefrom a digital data base file depicting an amplitude/time profile of the received signal with a resolution dependent on the sampling intervals; and computing means programmed to utilize the amplitude profile depicted by the data in said data base to help isolate relative to a time axis a portion of the output signal produced by said at least one shot deemed most probable to correspond to a wanted echo, and to determine a range represented by an echo within said portion of the time axis;

the improvement wherein the computing means is programmed to introduce a predetermined local upward adjustment into a time varying threshold file generated for comparison with the digital data base file depicting the profile of the received signal, the adjustment being at a location and of a magnitude such as to prevent detection of a spurious echo of known location and magnitude when the files are compared.

* * * * *